United States Patent
Siminoff et al.

(10) Patent No.: US 10,491,860 B2
(45) Date of Patent: Nov. 26, 2019

(54) AUDIO/VIDEO RECORDING AND COMMUNICATION DEVICES IN NETWORK COMMUNICATION WITH ADDITIONAL CAMERAS

(71) Applicant: Amazon Technologies, Inc., Seattle, WA (US)

(72) Inventors: James Siminoff, Pacific Palisades, CA (US); Elliott Lemberger, Santa Monica, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/253,134

(22) Filed: Jan. 21, 2019

(65) Prior Publication Data

US 2019/0174094 A1    Jun. 6, 2019

Related U.S. Application Data

(63) Continuation of application No. 15/872,827, filed on Jan. 16, 2018, now Pat. No. 10,205,909.

(Continued)

(51) Int. Cl.
*H04N 7/14* (2006.01)
*G08B 13/196* (2006.01)
(Continued)

(52) U.S. Cl.
CPC .............. *H04N 7/147* (2013.01); *G08B 3/10* (2013.01); *G08B 13/19636* (2013.01);
(Continued)

(58) Field of Classification Search
CPC .............. H04N 7/147; H04N 5/23219; H04N 5/23206; H04N 5/2258; H04N 5/2252;
(Continued)

(56) References Cited

U.S. PATENT DOCUMENTS

2004/0212677 A1* 10/2004 Uebbing ................ H04N 5/247
348/155
2015/0085060 A1* 3/2015 Fish ........................ G06F 1/266
348/14.03

(Continued)

*Primary Examiner* — Stella L. Woo
(74) *Attorney, Agent, or Firm* — Chong IP Law, LLP

(57) ABSTRACT

Audio/video (A/V) recording and communication devices in network communication with additional cameras in accordance with various embodiments of the present disclosure are provided. In one embodiment, an audio/video (A/V) recording and communication device is provided comprising: a first camera configured to capture image data at a first resolution; a communication module; and a processing module operatively connected to the first camera and the communication module, wherein the processing module is in network communication with a backend server, the processing module comprising: a processor; and a camera application that configures the processor to: maintain the first camera in a low-power state; receive a power-up command signal from the backend server based on an output signal from a second camera; power up the first camera in response to the power-up command signal; and capture image data using the first camera in response to the power-up command signal.

20 Claims, 23 Drawing Sheets

Related U.S. Application Data

(60) Provisional application No. 62/446,703, filed on Jan. 16, 2017.

(51) Int. Cl.
| | |
|---|---|
| *H04N 5/232* | (2006.01) |
| *H04N 5/76* | (2006.01) |
| *H04N 7/18* | (2006.01) |
| *H04N 5/77* | (2006.01) |
| *H04N 5/225* | (2006.01) |
| *G08B 3/10* | (2006.01) |

(52) U.S. Cl.
CPC ..... *G08B 13/19643* (2013.01); *H04N 5/2252* (2013.01); *H04N 5/2258* (2013.01); *H04N 5/23206* (2013.01); *H04N 5/23219* (2013.01); *H04N 5/23241* (2013.01); *H04N 5/76* (2013.01); *H04N 5/77* (2013.01); *H04N 7/142* (2013.01); *H04N 7/181* (2013.01); *H04N 7/186* (2013.01); *G08B 13/19656* (2013.01); *G08B 13/19658* (2013.01); *H04N 5/23254* (2013.01); *H04N 5/23258* (2013.01)

(58) Field of Classification Search
CPC .......... H04N 7/142; H04N 5/77; H04N 7/186; H04N 7/181; H04N 5/23241; H04N 5/76; H04N 5/23258; H04N 5/23254; G08B 13/19643; G08B 3/10; G08B 13/19636; G08B 13/19656; G08B 13/19658
See application file for complete search history.

(56) References Cited

U.S. PATENT DOCUMENTS

| | | | |
|---|---|---|---|
| 2017/0262706 A1* | 9/2017 | Sun | .................... G06K 9/00751 |
| 2018/0191885 A1* | 7/2018 | Sarrasin | ............. H04M 1/6033 |

* cited by examiner

AUDIO/VIDEO RECORDING AND COMMUNICATION DEVICES IN NETWORK COMMUNICATION WITH ADDITIONAL CAMERAS

CROSS-REFERENCE TO RELATED APPLICATIONS

This application is a continuation of application Ser. No. 15/872,827, filed on Jan. 16, 2018, which claims priority to provisional application Ser. No. 62/446,703, filed on Jan. 16, 2017. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments relate to improvements in the functionality of A/V recording and communication devices that strengthen the ability of such devices to reduce crime and enhance public safety.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present audio/video (A/V) recording and communication devices with multiple cameras now will be discussed in detail with an emphasis on highlighting the advantageous features. These embodiments depict the novel and non-obvious A/V recording and communication devices with multiple cameras shown in the accompanying drawings, which are for illustrative purposes only. These drawings include the following figures, in which like numerals indicate like parts.

DETAILED DESCRIPTION

Figure 1:
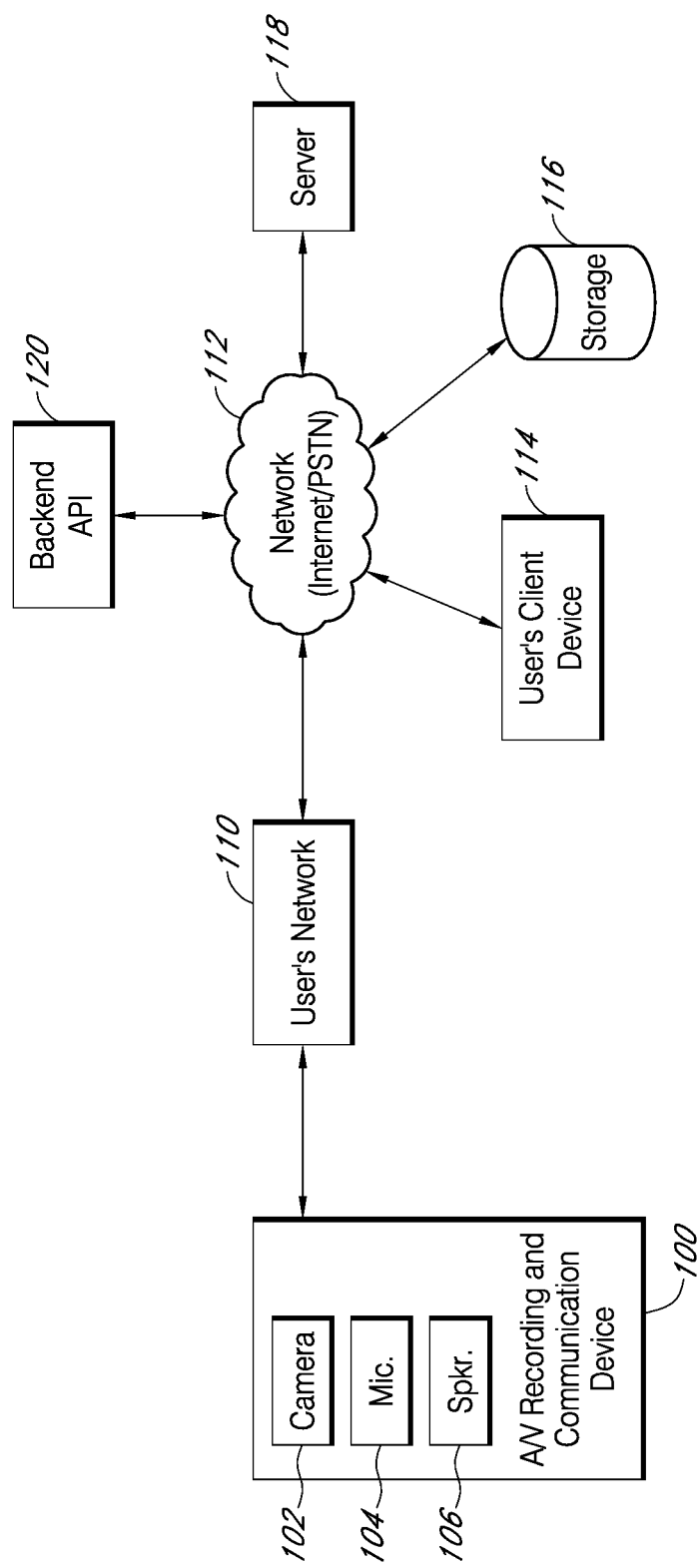
FIG. 1 is a functional block diagram illustrating a system for streaming and storing A/V content captured by an audio/video (A/V) recording and communication device according to various aspects of the present disclosure.

The various embodiments of the present audio/video (A/V) recording and communication devices in network communication with at least one second camera have several features, no single one of which is solely responsible for their desirable attributes. Without limiting the scope of the present embodiments as expressed by the claims that follow, their more prominent features now will be discussed briefly.

After considering this discussion, and particularly after reading the section entitled "Detailed Description," one will understand how the features of the present embodiments provide the advantages described herein.

One aspect of the present embodiments includes the realization that A/V recording and communication devices could be enhanced by being in network communication with at least one second camera through a backend server (and/or through direct connection, such as using a "short-link" radio technology (e.g., Bluetooth, Bluetooth low energy, ANT, ANT+, ZigBee, etc.)). For example, the second camera and the A/V recording and communication device having a first camera may be in different geographic locations, with the second camera providing and enabling functionalities that might not be possible if the first and second cameras were part of a single device. For example, image data from the second camera may be analyzed, such as at a backend server, to determine if a person or an object in the image data presents a potential danger. In one example, a person depicted in the image data may be a known criminal. In another example, an object depicted in the image data may be a weapon or instrument of destruction. If a person or object in the image data presents a potential danger, the first camera may be powered up to record image data that may include the person or object of interest, which may then be used, such as by law enforcement, to capture the dangerous person and/or to neutralize the danger presented by the dangerous object. In some embodiments, multiple cameras of multiple A/V recording and communication devices may be powered up to record image data when it is determined that the image data from the second camera indicates a person and/or object of interest/danger.

In some embodiments, the second camera could have different performance characteristics from the first camera, such as different resolution and/or different power consumption. In one example, the second camera may be a low-power, low-resolution camera that may be powered on at all times, while the first camera of the A/V recording and communication device may be a high-power, high-resolution camera that is maintained in a low-power state. The second camera may then be used in a process for determining when to power up the high-power, high-resolution first camera of the A/V recording and communication device. This arrangement can have particular benefit in a battery-powered A/V recording and communication device, where conserving batter power is desirable to prolong the usable life of the device between battery charges. In addition, the backend server may be configured determine locations of the second camera and the A/V recording and communication device to determine when to power up the A/V recording and communication device using geographic boundaries. These and other aspects and advantages of the present embodiments are described in further detail below.

The following detailed description describes the present embodiments with reference to the drawings. In the drawings, reference numbers label elements of the present embodiments. These reference numbers are reproduced below in connection with the discussion of the corresponding drawing features.

The embodiments of the present audio/video (A/V) recording and communication devices in network communication with at least one second camera are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) device 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and/or functionality of the doorbells described herein, but without the front button and related components.

The A/V recording and communication device 100 may be located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication device 100 may also include other hardware and/or components, such as a housing, a communication module (which may facilitate wired and/or wireless communication with other devices), one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE, Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell).

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
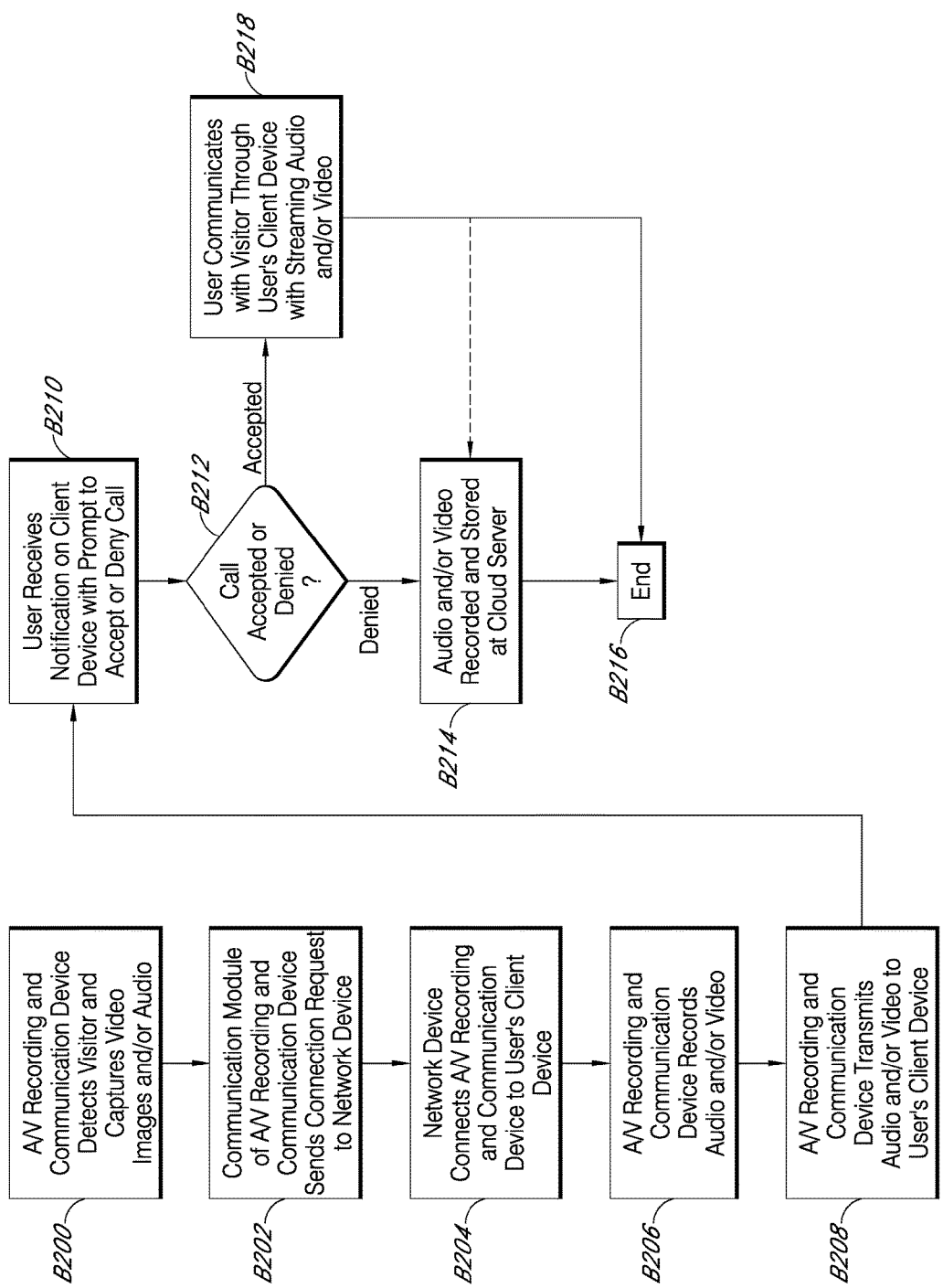
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B200, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B202, a communication module of the A/V recording and communication device 100 sends a connection request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B204 the network device may connect the A/V recording and communication device 100 to the user's client device 114 through the user's network 110 and the network 112. At block B206, the A/V recording and communication device 100 may record available audio and/or video data using the camera 102, the microphone 104, and/or any other device/sensor available. At block B208, the audio and/or video data is transmitted (streamed) from the A/V recording and communication device 100 to the user's client device 114 via the user's network 110 and the network 112. At block B210, the user may receive a notification on his or her client device 114 with a prompt to either accept or deny the call.

At block B212, the process determines whether the user has accepted or denied the call. If the user denies the notification, then the process advances to block B214, where the audio and/or video data is recorded and stored at a cloud server. The session then ends at block B216 and the connection between the A/V recording and communication device 100 and the user's client device 114 is terminated. If, however, the user accepts the notification, then at block B218 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B216. In some embodiments, the audio and/or video data may be recorded and stored at a cloud server (block B214) even if the user accepts the notification and communicates with the visitor through the user's client device 114.

Figure 3:
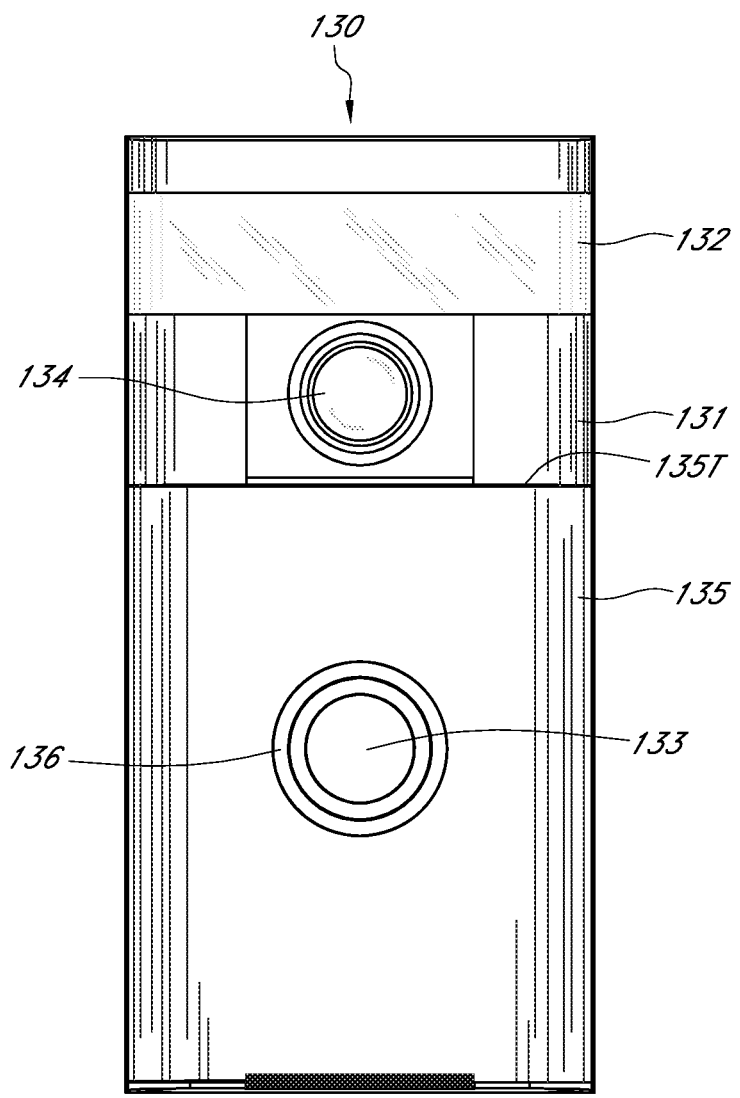
FIG. 3 is a front view of an A/V recording and communication device according to various aspects of the present disclosure.
Figure 4:
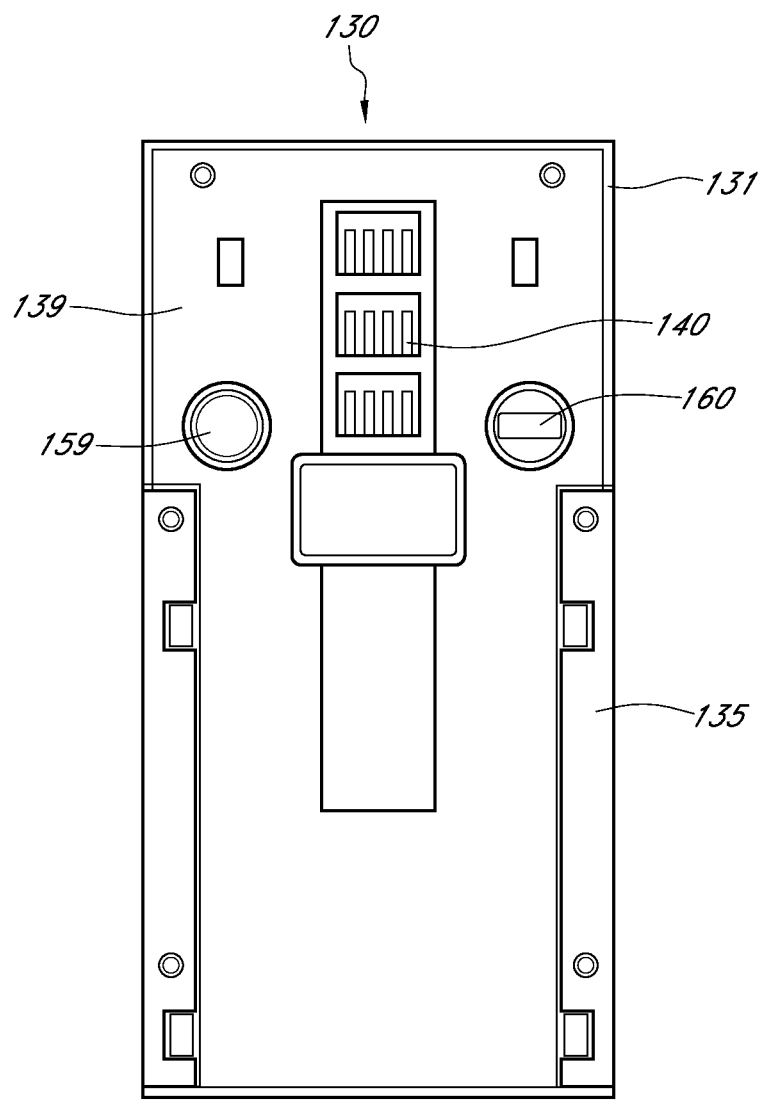
FIG. 4 is a rear view of the A/V recording and communication device of FIG. 3.
Figure 5:
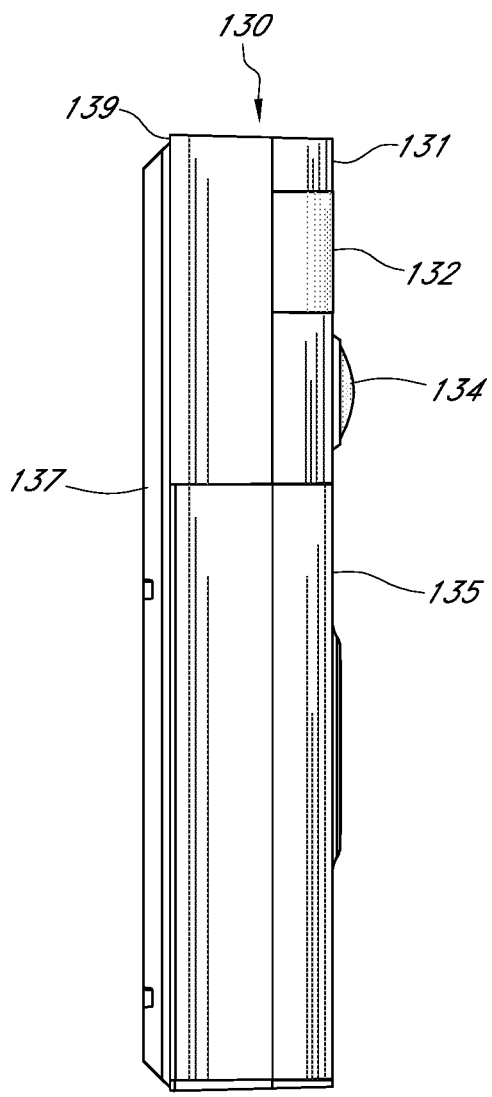
FIG. 5 is a left side view of the A/V recording and communication device of FIG. 3 attached to a mounting bracket according to various aspects of the present disclosure.

FIGS. 3-5 illustrate a wireless audio/video (A/V) communication doorbell 130 according to an aspect of present embodiments. FIG. 3 is a front view, FIG. 4 is a rear view, and FIG. 5 is a left side view of the doorbell 130 coupled with a mounting bracket 137. The doorbell 130 includes a faceplate 135 mounted to a back plate 139 (FIG. 4). With reference to FIG. 5, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 3, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 3 and 5, the doorbell 130 further includes an enclosure 131 that engages the faceplate 135. In the illustrated embodiment, the enclosure 131 abuts an upper edge 135T (FIG. 3) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 4 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 4, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 5 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 5, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 6:
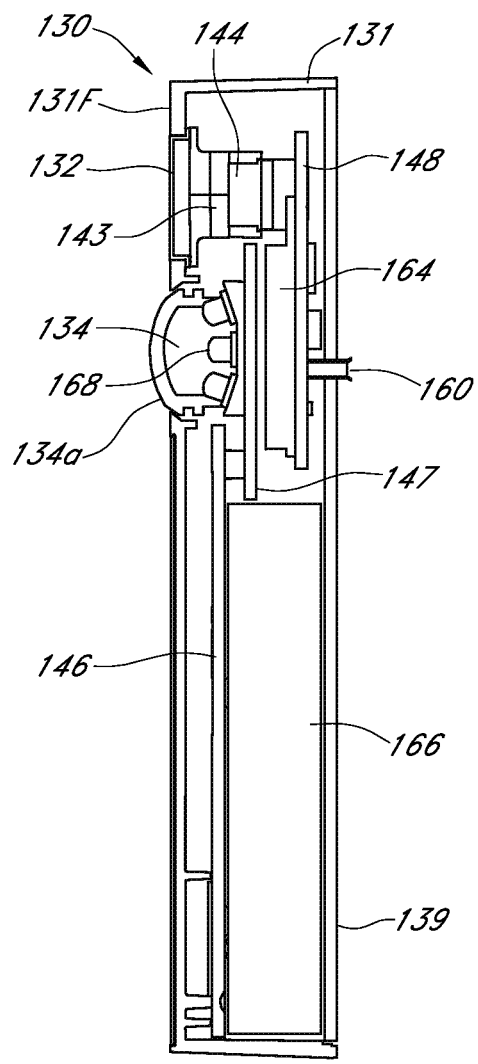
FIG. 6 is cross-sectional right side view of the A/V recording and communication device of FIG. 3.

FIG. 6 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 6, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160.

With continued reference to FIG. 6, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 6, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. In some embodiments, the doorbell 130 may comprise three PIR sensors 144, as further described below, but in other embodiments any number of PIR sensors 144 may be provided. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 7:
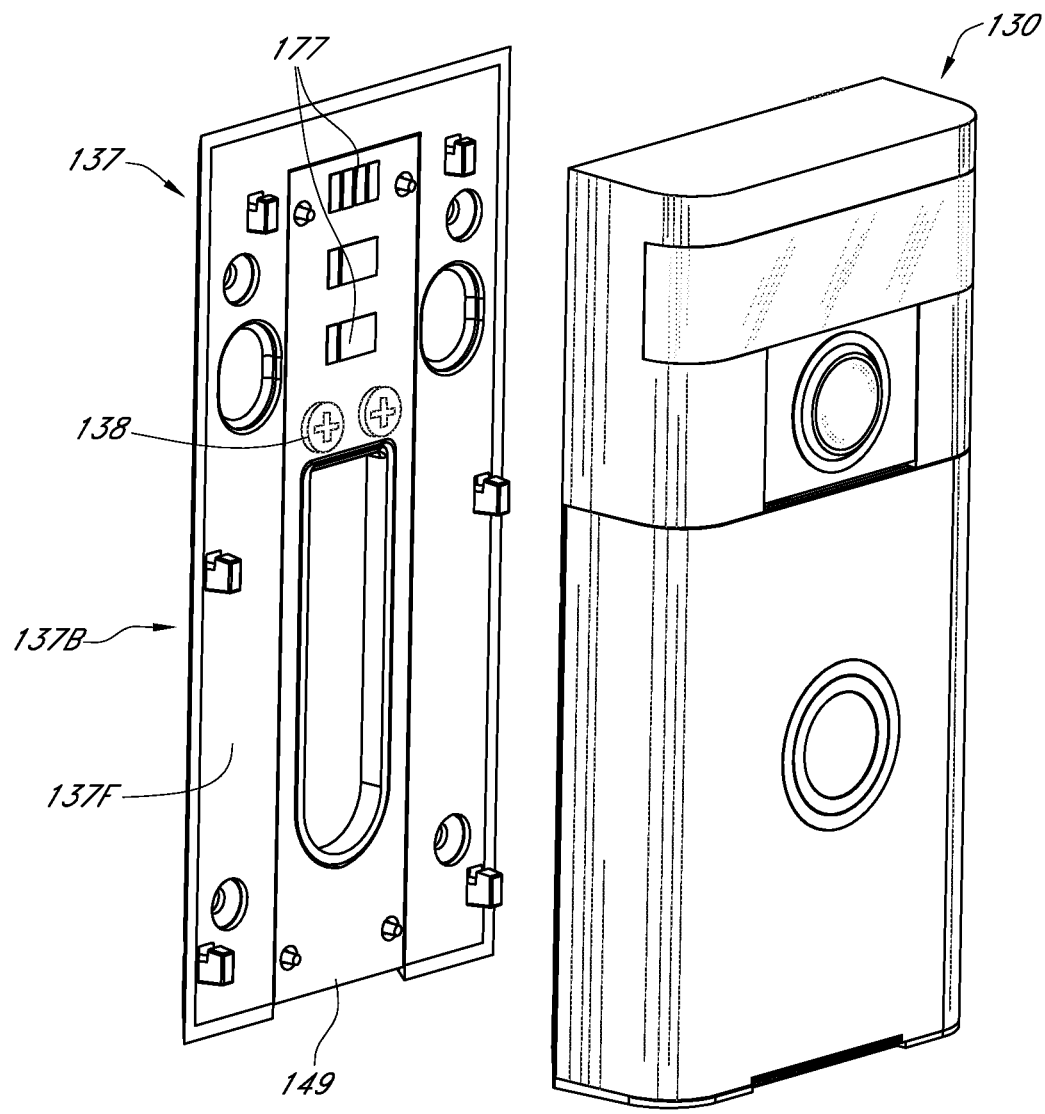
FIG. 7 is an exploded view of the A/V recording and communication device and the mounting bracket of FIG. 5.

FIG. 7 is an exploded view of the doorbell 130 and the mounting bracket 137 according to an aspect of the present embodiments. The mounting bracket 137 is configured to be mounted to a mounting surface (not shown) of a structure, such as a home or an office. FIG. 7 shows the front side 137F of the mounting bracket 137. The mounting bracket 137 is configured to be mounted to the mounting surface such that the back side 137B thereof faces the mounting surface. In certain embodiments the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 7, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 8:
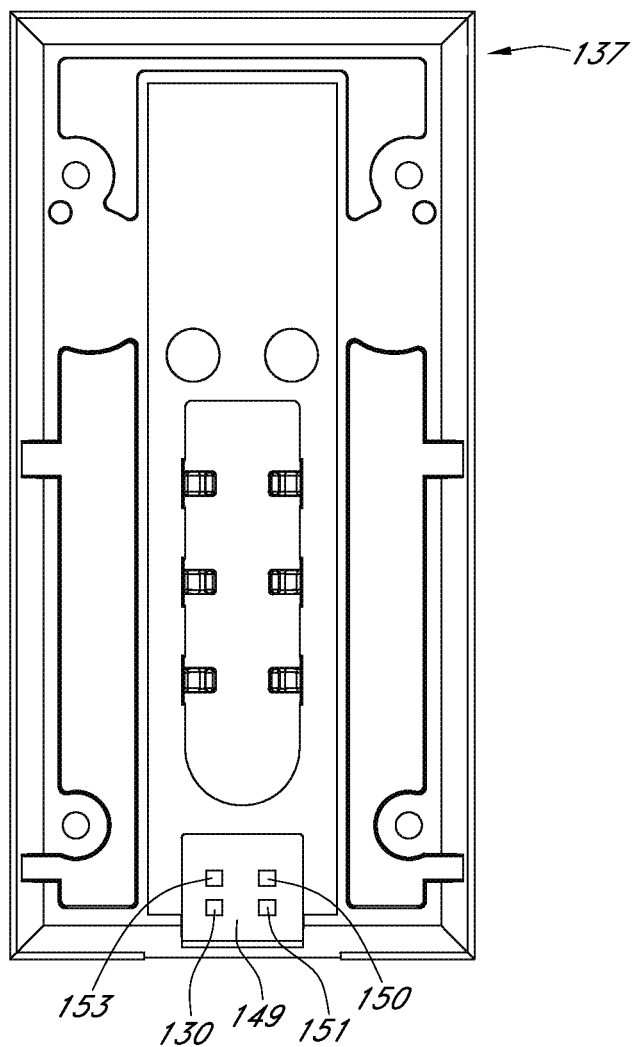
FIG. 8 is a rear view of the mounting bracket of FIG. 5.

With reference to FIGS. 7 and 8 (which is a rear view of the mounting bracket 137), the mounting bracket 137 further comprises a bracket PCB 149. With reference to FIG. 8, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 9:
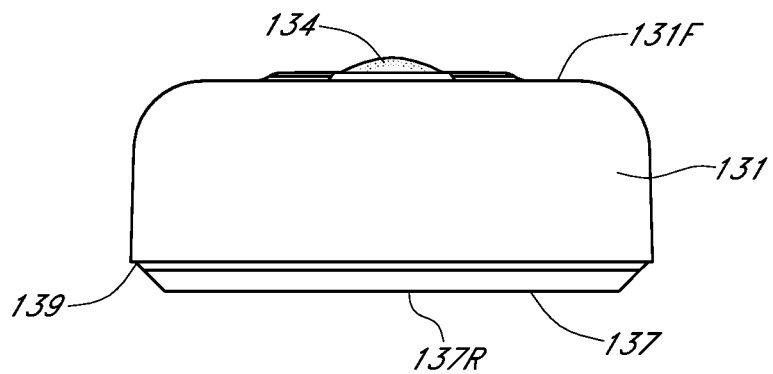
FIGS. 9 and 10 are top and bottom views, respectively, of the A/V recording and communication device and the mounting bracket of FIG. 5.
Figure 10:
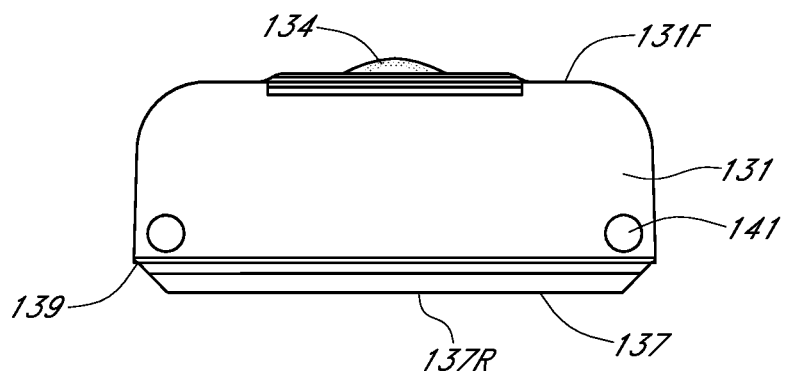

FIGS. 9 and 10 are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 10, the lower end of the enclosure 131 may include security screw apertures 141 configured to receive screws or other fasteners.

Figure 11:
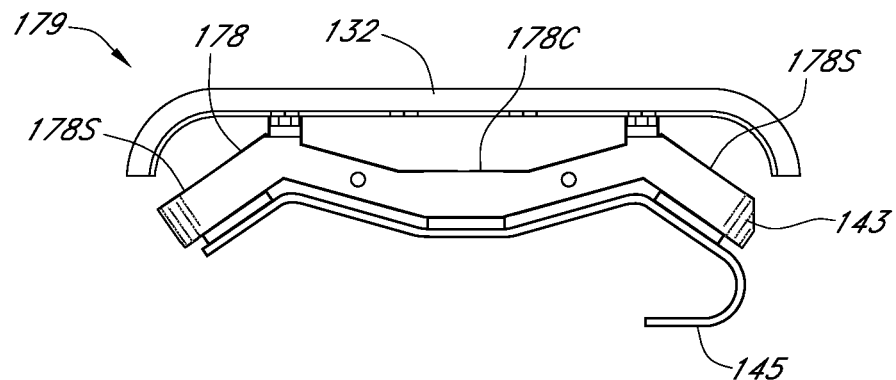
FIG. 11 is a top view of a passive infrared sensor assembly according to various aspects of the present disclosure.
Figure 12:
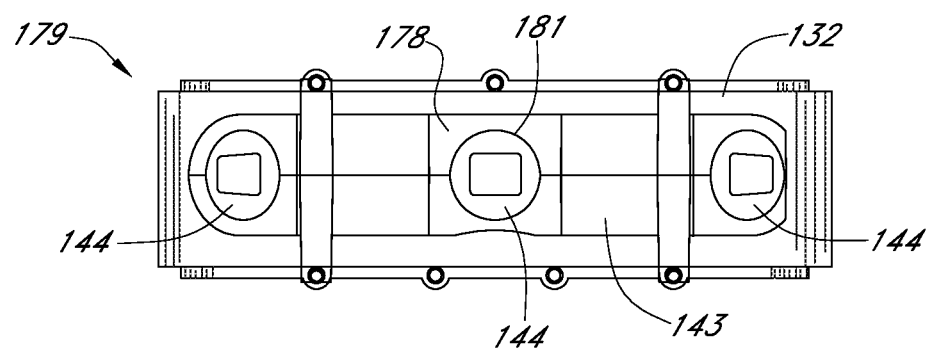
FIG. 12 is a front view of the passive infrared sensor assembly of FIG. 11.

FIG. 11 is a top view and FIG. 12 is a front view of a passive infrared sensor assembly 179 including the lens 132, the passive infrared sensor holder 143, the passive infrared sensors 144, and a flexible power circuit 145. The passive infrared sensor holder 143 is configured to mount the passive infrared sensors 144 facing out through the lens 132 at varying angles, thereby allowing the passive infrared sensor 144 field of view to be expanded to 180° or more and also broken up into various zones, as further described below. The passive infrared sensor holder 143 may include one or more faces 178, including a center face 178C and two side faces 178S to either side of the center face 178C. With reference to FIG. 12, each of the faces 178 defines an opening 181 within or on which the passive infrared sensors 144 may be mounted. In alternative embodiments, the faces 178 may not include openings 181, but may instead comprise solid flat faces upon which the passive infrared sensors 144 may be mounted. Generally, the faces 178 may be any physical structure capable of housing and/or securing the passive infrared sensors 144 in place.

With reference to FIG. 11, the passive infrared sensor holder 143 may be secured to the rear face of the lens 132. The flexible power circuit 145 may be any material or component capable of delivering power and/or data to and from the passive infrared sensors 144, and may be contoured to conform to the non-linear shape of the passive infrared sensor holder 143. The flexible power circuit 145 may connect to, draw power from, and/or transmit data to and from, the power printed circuit board 148.

Figure 13:
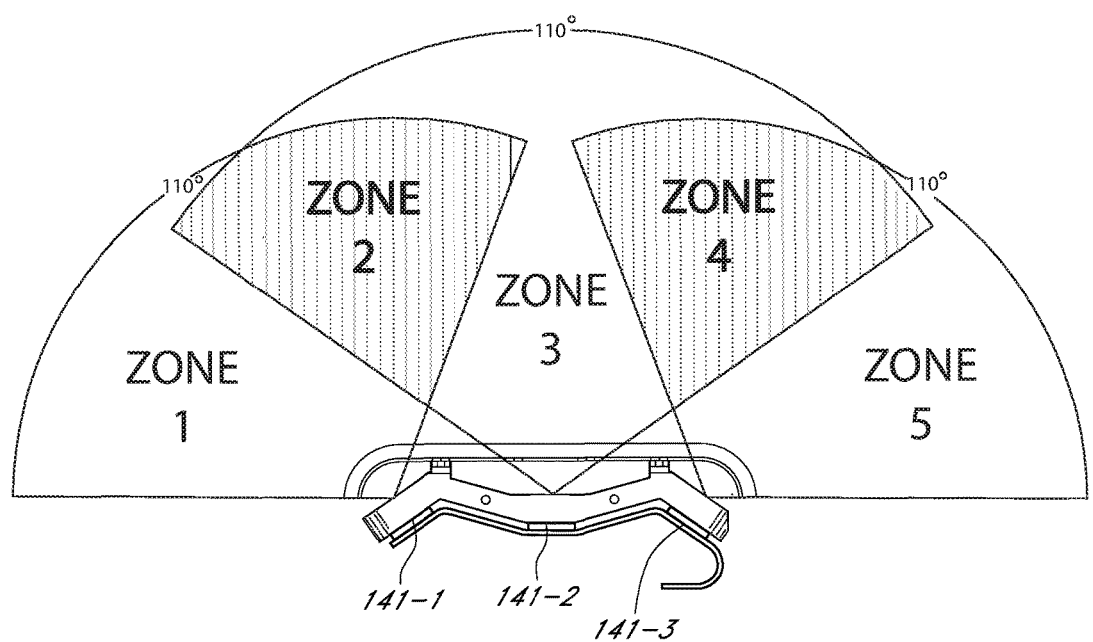
FIG. 13 is a top view of the passive infrared sensor assembly of FIG. 11, illustrating the fields of view of the passive infrared sensors according to various aspects of the present disclosure.

FIG. 13 is a top view of the passive infrared sensor assembly 179 illustrating the fields of view of the passive infrared sensors 144. In the illustrated embodiment, the side faces 178S of the passive infrared sensor holder 143 are angled at 55° facing outward from the center face 178C, and each passive infrared sensor 144 has a field of view of 110°. However, these angles may be increased or decreased as desired. Zone 1 is the area that is visible only to a first one of the passive infrared sensors 144-1. Zone 2 is the area that is visible only to the first passive infrared sensor 144-1 and a second one of the passive infrared sensors 144-2. Zone 3 is the area that is visible only to the second passive infrared sensor 144-2. Zone 4 is the area that is visible only to the second passive infrared sensor 144-2 and a third one of the passive infrared sensors 144-3. Zone 5 is the area that is visible only to the third passive infrared sensor 144-3. In some embodiments, the doorbell 130 may be capable of determining the direction that an object is moving based upon which zones are triggered in a time sequence.

Figure 14:
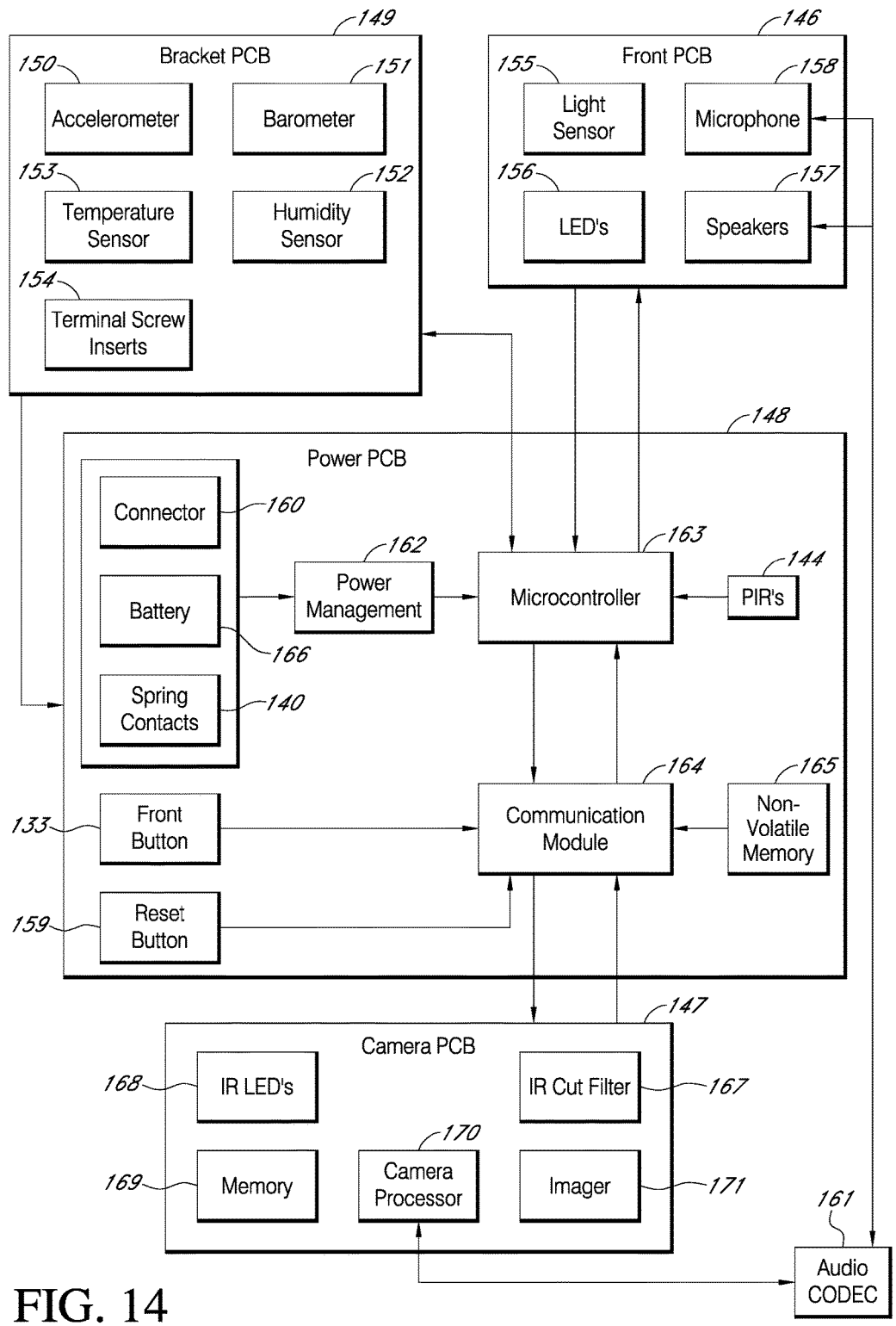
FIG. 14 a functional block diagram of the components of the A/V recording and communication device of FIG. 3.

FIG. 14 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 14, the bracket PCB 149 may further comprise terminal screw inserts 154, which may be configured to receive the terminal screws 138 and transmit power to the electrical contacts 177 on the mounting bracket 137 (FIG. 7). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 14, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electromechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 3). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 14, the power PCB 148 may comprise a power management module 162, a microcontroller 163 (may also be referred to as "processor," "CPU," or "controller"), the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. Still further, the battery 166 may comprise the sole source of power for the doorbell 130. In such embodiments, the spring contacts 140 may not be connected to a source of power. When the battery 166 is depleted of its charge, it may be recharged, such as by connecting a power source to the connector 160. The power management module 162 may also serve as a conduit for data between the connector 160 and the microcontroller 163.

With further reference to FIG. 14, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 14, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 14, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (e.g., 720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, the present embodiments leverage the capabilities of audio/video (A/V) recording and communication devices, thereby providing enhanced functionality to such devices to reduce crime and increase public safety. One aspect of the present embodiments includes the realization that A/V recording and communication devices could be enhanced by being in network communication with at least one second camera through a backend server (and/or through direct connection, such as using a "short-link" radio technology (e.g., Bluetooth)). For example, the second camera and the A/V recording and communication device having a first camera may be in different geographic locations with the second camera providing and enabling functionalities that might not be possible if the first and second cameras were part of a single device. For example, image data from the second camera may be analyzed, such as at a backend server, to determine if a person or an object in the image data presents a potential danger. In one example, a person depicted in the image data may be a known criminal. In another example, an object depicted in the image data may be a weapon or instrument of destruction. If a person or object in the image data presents a potential danger, the first camera may be powered up to record image data that may include the person or object of interest, which may then be used, such as by law enforcement, to capture the dangerous person and/or to neutralize the danger presented by the dangerous object. In some embodiments, multiple cameras of multiple A/V recording and communication devices may be powered up to record image data when it is determined that the image data from the second camera indicates a person and/or object of interest/danger.

In some embodiments, the second camera could have different performance characteristics from the first camera, such as different resolution and/or different power consumption. In one example, the second camera may be a low-power, low-resolution camera that may be powered on at all times, while the first camera of the A/V recording and communication device may be a high-power, high-resolution camera that is maintained in a low-power state. The second camera may then be used in a process for determining when to power up the high-power, high-resolution camera of the A/V recording and communication device. This arrangement can have particular benefit in a battery-powered A/V recording and communication device, where conserving battery power is desirable to prolong the usable life of the device between battery charges. In addition, the backend server may determine locations of the second camera and the A/V recording and communication device to determine when to power up the A/V recording and communication device using geographic boundaries. These and other aspects and advantages of the present embodiments are described in further detail below.

Figure 15:
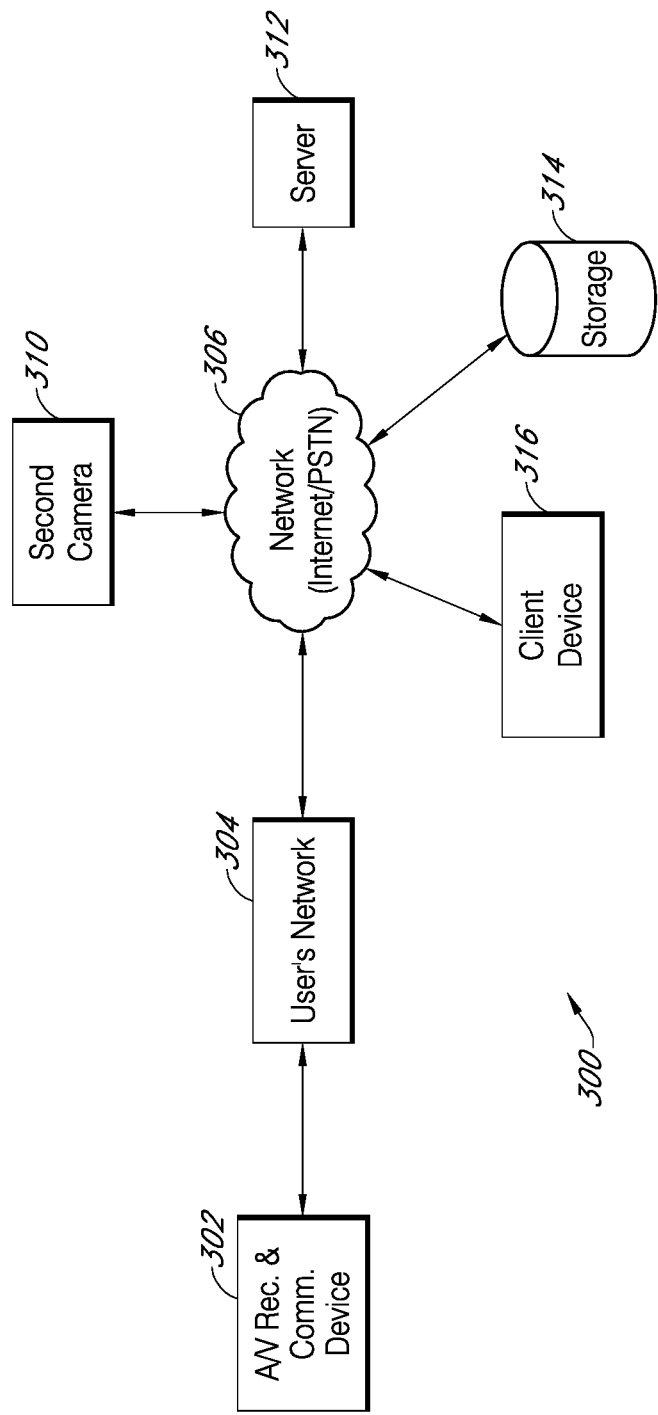
FIG. 15 is a functional block diagram illustrating a system for using a second camera in network communication with an A/V recording and communication device according to various aspects of the present disclosure.

FIG. 15 is a functional block diagram illustrating a system for using a second camera in network communication with an audio/video (A/V) recording and communication device according to various aspects of the present disclosure. The system 300 may include an A/V recording and communication device 302 configured to access a user's network 304 to connect to a network (Internet/PSTN) 306. In various embodiments, the system 300 may also include a second camera 310 in network communication with the A/V recording and communication device 302. In some embodiments, the second camera may connect to the network (Internet/PSTN) 306 using a cellular network, a public network, a low-bandwidth network, and/or any other appropriate network to access the network (Internet/PSTN) 306. In various embodiments, the second camera 310 may be used in powering up a first camera of the A/V recording and communication device 302 using processes as further described below. In alternative embodiments, the second camera may connect to the A/V recording and communication device 302 directly, such as using a "short-link" radio technology (e.g., Bluetooth, Bluetooth low energy, ANT, ANT+, ZigBee, etc.).

With reference to FIG. 15, the system 300 may also include a user's client device 316 configured to be in network communication with the A/V recording and communication device 302. The system 300 may also include a storage device 314 and a backend server 312 in network communication with the A/V recording and communication device 302 and the second camera 310. In some embodiments, the storage device 314 may be a separate device from the backend server 312 (as illustrated) or may be an integral component of the backend sever. The user's network 304 and the network 306 may be similar in structure and/or function to the user's network 110 and the network 112 (FIG. 1), respectively. In some embodiments, the A/V recording and communication device 302 may be similar in structure and/or function to the A/V recording and communication device 100 (FIG. 1) and/or the A/V recording and communication doorbell 130 (FIGS. 3-13). In some embodiments, the user's client device 316 and the storage device 314 may be similar in structure and/or function to the user's client device 114 and the storage device 116 (FIG. 1), respectively. Also in some embodiments, the backend server 312 may be similar in structure and/or function to the server 118 and/or the backend API 120 (FIG. 1).

Figure 16:
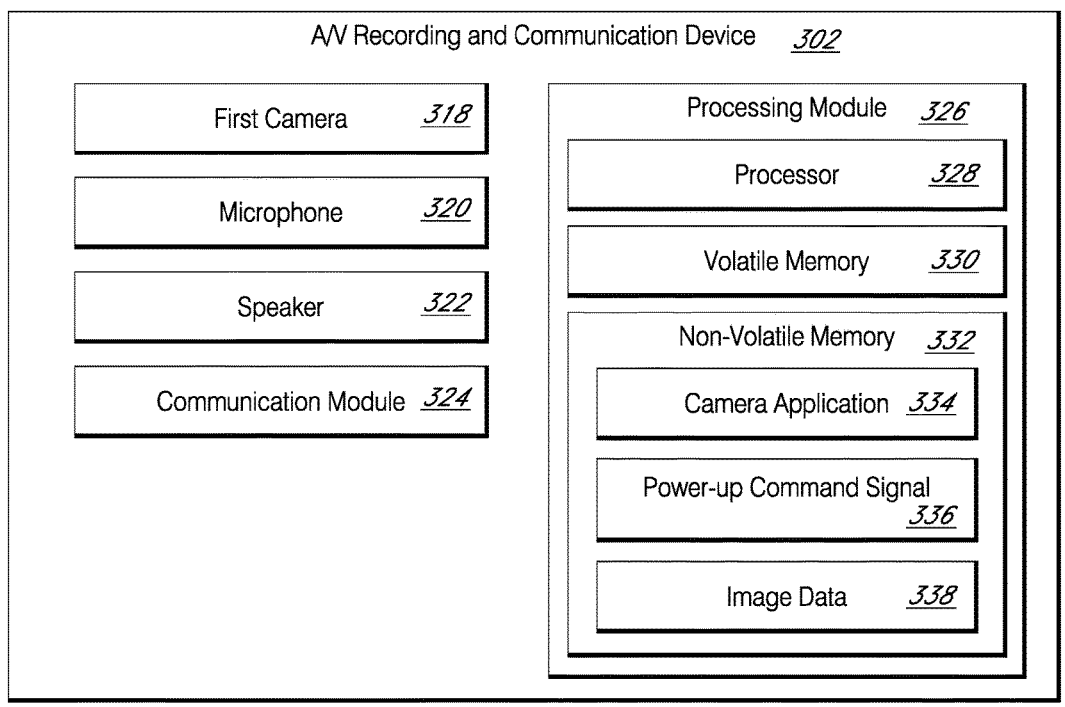
FIG. 16 is a functional block diagram illustrating one embodiment of an A/V recording and communication device according to various aspects of the present disclosure.

FIG. 16 is a functional block diagram illustrating an embodiment of the A/V recording and communication device 302 according to various aspects of the present disclosure. The A/V recording and communication device 302 may comprise a processing module 326 that is operatively connected to a first camera 318, a microphone 320, a speaker 322, and a communication module 324. The processing module 326 may comprise a processor 328, volatile memory 330, and non-volatile memory 332 that includes a camera application 334. The camera application 334 may configure the processor 328 to perform one or more processes for powering up the first camera 318 in response to a power-up command signal 336 received from the backend server 312, as further described below. The camera application 334 may also configure the processor 328 to capture image data 338 using the first camera 318 upon powering up, as further described below. In some embodiments, the first camera 318 may capture image data at a first resolution, as further described below. In various embodiments, the image data 338 and the power-up command signal 336 may be saved in the non-volatile memory 332. Further, a communication module, such as the communication module 324, may comprise (but is not limited to) one or more transceivers and/or wireless antennas (not shown) configured to transmit and receive wireless signals. In further embodiments, the communication module 324 may comprise (but is not limited to) one or more transceivers configured to transmit and receive wired and/or wireless signals.

Figure 17:
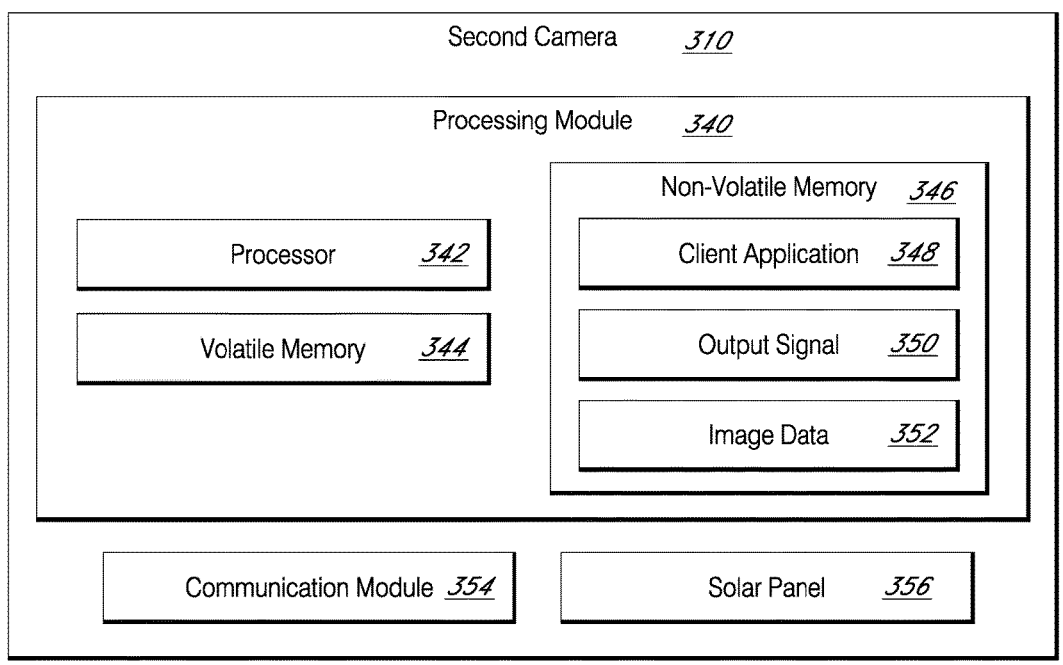
FIG. 17 is a functional block diagram illustrating one embodiment of a second camera according to various aspects of the present disclosure.

FIG. 17 is a functional block diagram illustrating an embodiment of the second camera 310 according to various aspects of the present disclosure. In some embodiments, the second camera 310 may be a standalone unit (as illustrated) or an integral part of another device, such as another A/V recording and communication device, such as an A/V recording and communication doorbell. Further, the second camera 310 may have its own processing capabilities (as illustrated) or may be controlled and configured by a separate processing module (not illustrated). The second camera 310 may include a communication module 354 for network communication with the A/V recording and communication device 302 and/or the backend server 312. In some embodiments, the second camera 310 may include a processing module 340 comprising a processor 342, volatile memory 344, and non-volatile memory 346. The non-volatile memory 346 may comprise a camera application 348 that configures the processor 342 to perform a variety of camera functions including capturing image data 352 and generating an output signal 350. In some embodiments, the captured image data 352 and/or the output signal 350 may be stored in the non-volatile memory 346. In various embodiments, the second camera 310 may be configured to capture the image data 352 at a second resolution. The second camera 310 may also include at least one solar panel 356 as a power source. Similarly, the A/V recording and communication device 302 may also include at least one solar panel (not shown) as a power source.

In reference to FIGS. 16 and 17, the first resolution of the first camera 318 and the second resolution of the second camera 310 may be different. In some embodiments, the first resolution may be higher than the second resolution, or vice versa. The different resolutions of the first and second cameras 318, 310 may result in the lower resolution camera also consuming less power than the higher resolution camera. In alternative embodiments, one of the cameras 318, 310 may consume less power than the other camera 310, 318, even if the difference in power consumption is unrelated to the resolution(s) of the two cameras 310, 318. For example, in some embodiments the two cameras 318, 310 may have similar (or the same) resolution, but one of the cameras 318, 310 may consume less power than the other camera 310, 318.

With further reference to FIGS. 16 and 17, the image data 338, 352 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments.

Figure 18:
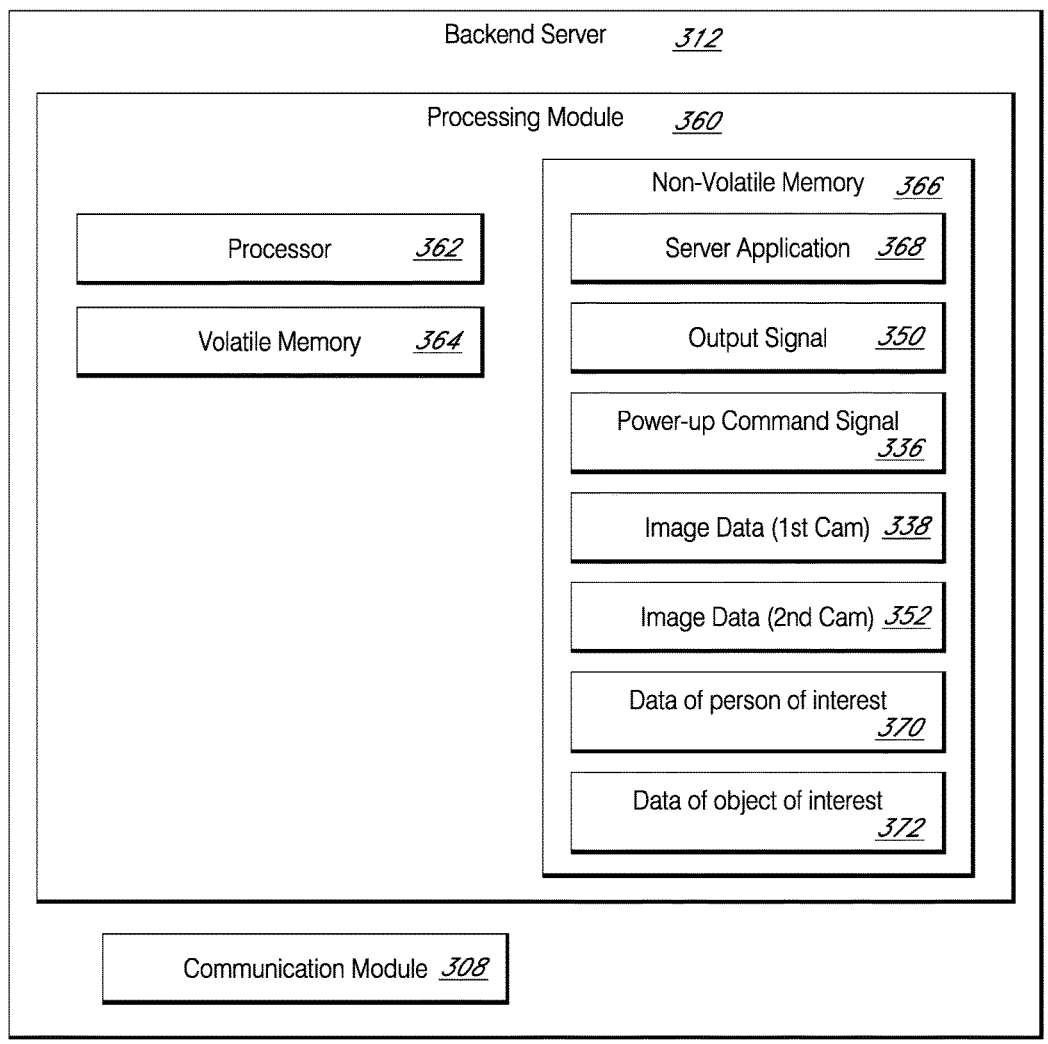
FIG. 18 is a functional block diagram illustrating one embodiment of a backend server according to various aspects of the present disclosure.

FIG. 18 is a functional block diagram illustrating one embodiment of the backend server 312 according to various aspects of the present disclosure. The backend server 312 may comprise a processing module 360 comprising a processor 362, volatile memory 364, a communication module 308, and non-volatile memory 366. The communication module 308 may allow the backend server 312 to access and communicate with devices connected to the network (Internet/PSTN) 306. The non-volatile memory 366 may include a server application 368 that configures the processor 362 to perform processes for using the second camera 310 to enhance the functionalities and performance of the A/V recording and communication device 302, as further described below. The non-volatile memory 366 may include the output signal 350 received from the second camera 310 and, in some embodiments, the image data 352 captured using the second camera 310. Upon receiving the output signal 350, the backend server 312 may generate a power-up command signal 336 for powering up the A/V recording and communication device 302, as further described below. In various embodiments, the non-volatile memory 366 may also include the image data 338, 352 captured by the first and second cameras, respectively, and data of a person and/or object of interest 370, 372, as further described below.

In the illustrated embodiment of FIGS. 16-18, the various components including (but not limited to) the processing modules 326, 340, 360 and the communication modules 324, 354, 308 are represented by separate boxes. The graphical representations depicted in each of FIGS. 16-18 are, however, merely examples, and are not intended to indicate that any of the various components of the A/V recording and communication device 302, the second camera 310, or the backend server 312 are necessarily physically separate from one another, although in some embodiments they might be. In other embodiments, however, the structure and/or functionality of any or all of the components of the A/V recording and communication device 302 may be combined. For example, in some embodiments the communication module 324 may include its own processor, volatile memory, and/or non-volatile memory. Likewise, the structure and/or functionality of any or all of the components of the second camera 310 may be combined. For example, in some embodiments the communication module 354 may include its own processor, volatile memory, and/or non-volatile memory. Further, the structure and/or functionality of any or all of the components of the backend server 312, may be combined. For example, in some embodiments the communication module 308 may include its own processor, volatile memory, and/or non-volatile memory.

Figure 19:
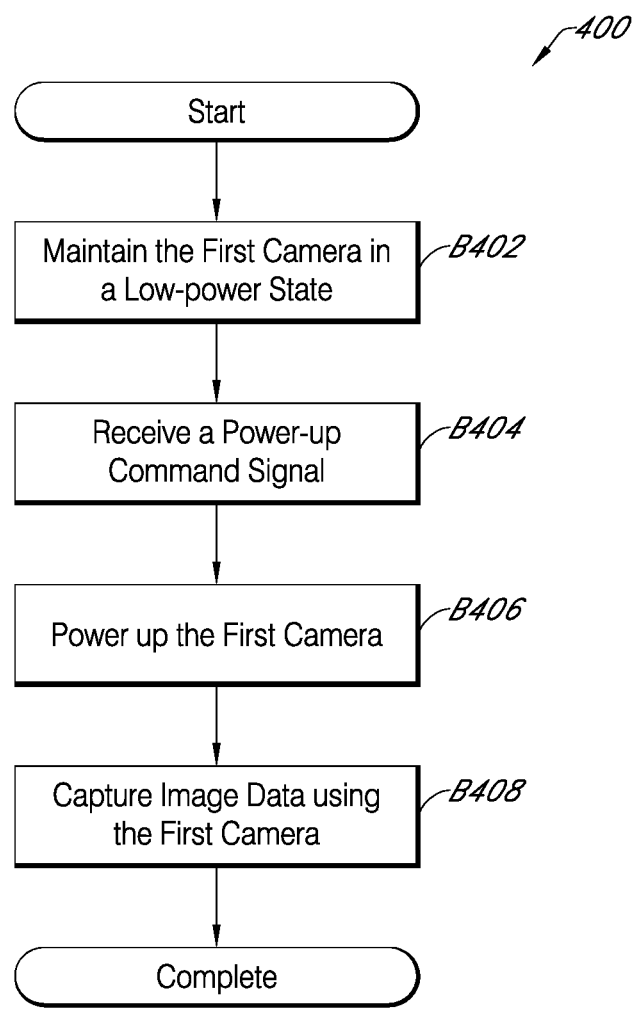
FIG. 19 is a flowchart illustrating an embodiment of a process for powering up a first camera of an A/V recording and communication device using a second camera according to various aspects of the present disclosure.

FIG. 19 is a flowchart illustrating one embodiment of a process 400 for powering up the first camera 318 of the A/V recording and communication device 302 using the second camera 310 according to various aspects of the present disclosure. In some embodiments, the second camera 310 may capture image data at a lower resolution and/or consume less power than the first camera 318. Further, the second camera 310 may remain in a persistent powered-up state and be configured to capture image data at all times. In contrast, the first camera 318 may capture image data at a higher resolution and/or consume more power than the second camera 310. In addition, the first camera 318 may be configured to remain in a powered-down state most of the time (may also be referred to as a hibernation state, or a low-power state, or an off state, or the like). This configuration, in which the second camera 310 is always powered on and the first camera 318 is usually powered down, advantageously conserves power, which is of particular advantage in embodiments in which the A/V recording and communication device 302 is powered by a rechargeable battery (e.g., is not connected to a source of external power, such as AC mains).

With reference to FIG. 19, the process 400 may include maintaining (block B402) the first camera 318 in a low-power state to conserve and reduce the amount of power used by the A/V recording and communication device 302. The process 400 may also include receiving (block B404) a power-up command signal 336, using the communication module 324, from the backend server 312 based on an output signal 350 from the second camera 310, as further described below. In some embodiments, receiving (block B404) the power-up command signal 336, using the communication module 324, may comprise receiving the power-up command signal 336 directly from the second camera 310 based on the output signal 350 from the second camera 310. In response to the power-up command signal 336, the first camera 318 may be powered up (block B406) and the A/V recording and communication device 302 may be configured to capture (block B408) image data 338 using the first camera 318. In some embodiments, the first camera 318 may revert back to the low-power state after capturing image data 338 for a predetermined length of time, or after motion within the field of view of the first camera 318 ceases. In some embodiments, the A/V recording and communication device 302 may be configured to transmit the image data 338 captured using the first camera 318 to the backend server 312 using the communication module 324. In some further embodiments, the A/V recording and communication device 302 may be configured to transmit the image data 338 captured using the first camera 318 to the client device 316 using the communication module 324.

Figure 20:
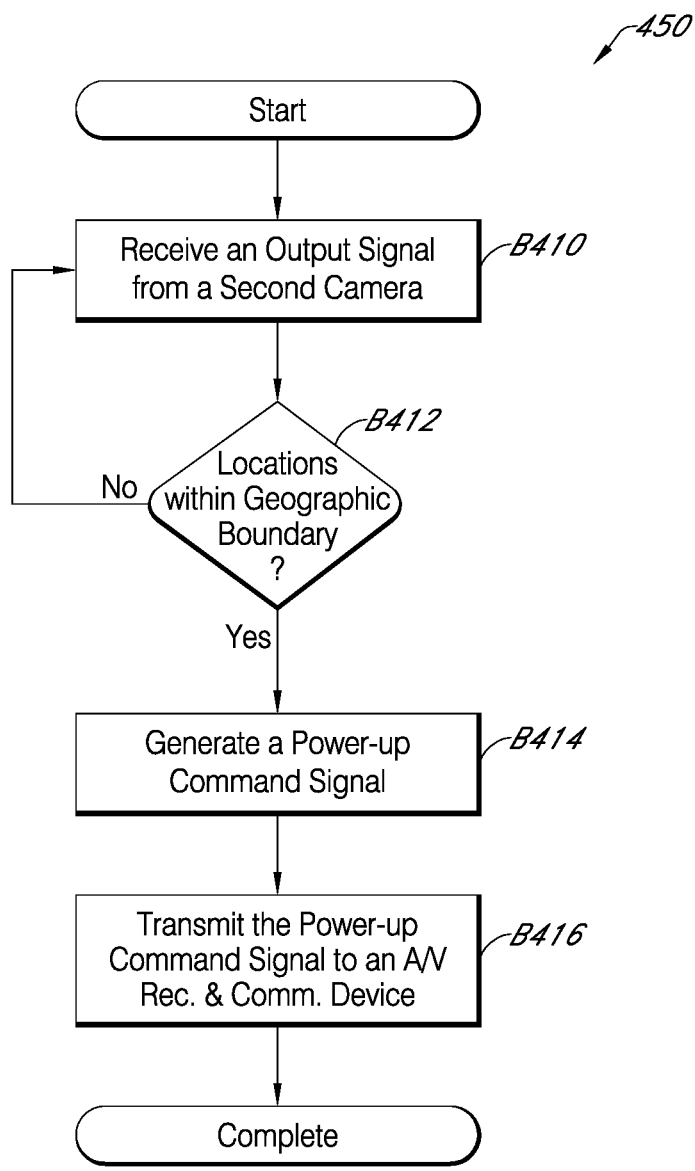
FIG. 20 is a flowchart illustrating another embodiment of a process for powering up a first camera of an A/V recording and communication device using a second camera according to various aspects of the present disclosure.

FIG. 20 is a flowchart illustrating another embodiment of a process 450 for powering up the first camera 318 of the A/V recording and communication device 302 using the second camera 310 according to various aspects of the present disclosure. In various embodiments, the second camera 310 may be configured to capture image data 352 and transmit the output signal 350 to the backend server 312 using the communication module 354. In some embodiments, the image data 352 captured by the second camera 310 may be used to determine whether motion is present, such as by comparing pixel changes in successive video frames, before transmitting the output signal 350 to the backend server 312. In reference to FIG. 20, the process 450 may include receiving (block B410) the output signal 350 from the second camera 310 using the communication module 308. In some embodiments, the process 450 may include determining a location of the second camera 310 and a location of the A/V recording and communication device 302, as further described below. In some embodiments, if the locations of the second camera 310 and the A/V recording and communication device 302 are not within a geographic boundary (block B412), as further described below, then the process may continue to receive (block B410) an output signal from the second camera 310. However, if the locations of the second camera 310 and the A/V recording and communication device 302 are within a geographic boundary (block B412), as further described below, then the server 312 may generate (block B414) the power-up command signal 336 based on the output signal 350 received from the second camera 310. The process 450 may also include transmitting (block B416) the power-up command signal 336 to the A/V recording and communication device 302 in network communication with the server 312, wherein the power-up command signal 336 configures the first camera 318 of the A/V recording and communication device 302 to power up from a low-power state and capture image data, as described above.

With reference to FIGS. 17 and 20, in some embodiments, the output signal 350 received at the backend server 312 from the second camera 310 (block B410) may include image data 352 captured by the second camera 310. In various embodiments, the backend server 312 may be configured to determine a person of interest 370 based on the image data 352 captured using the second camera 310. For example, the backend server 312 may compare the image data 352 with data in one or more databases to determine if a person (or persons) depicted in the image data 352 is found in the one or more databases. If a match is found (if the person depicted in the image data 352 is found in the one or more databases), then the backend server 312 may transmit the power-up command signal 336 to the A/V recording and communication device 302. However, if a match is not found (if the person depicted in the image data 352 is not found in the one or more databases), then the backend server 312 may not transmit the power-up command signal 336 to the A/V recording and communication device 302. In various embodiments, the one or more databases may include criminal databases/registries or law enforcement servers/databases. In another example, the backend server 312 may compare the image data 352 with data in one or more social networks to determine if a person (or persons) depicted in the image data 352 is found in the one or more social networks. For example, the social network may include any social media service or platform that uses computer-mediated tools that allow participants to create, share, and/or exchange information in virtual communities and/or networks, such as (but not limited to) social networking websites and/or applications running on participant devices. Non-limiting examples of social networks include Facebook, Twitter, Snapchat, and Nextdoor.

The backend server 312 may also be configured to determine an object of interest 372 based on the image data 352 captured using the second camera 310. For example, the backend server 312 may compare the image data 352 with data in one or more databases to determine if an object (or objects) depicted in the image data 352 is found in the one or more databases. If a match is found (if the object depicted in the image data 352 is found in the one or more databases), then the backend server 312 may transmit the power-up command signal 336 to the A/V recording and communication device 302. However, if a match is not found (if the object depicted in the image data 352 is not found in the one or more databases), then the backend server 312 may not transmit the power-up command signal 336 to the A/V recording and communication device 302. In various embodiments, the one or more databases may include data and/or images of objects that may indicate a danger to the public or to one or more persons, such as weapons (e.g., guns, knives, clubs, etc.) or instruments of destruction (e.g., bombs, explosives, etc.).

In further reference to FIG. 20, the backend server 312 may be configured to transmit data of the person 370 and/or object 372 of interest to the A/V recording and communication device 302, the client device 316, and/or a law enforcement agency using the communication module 308. In some embodiments, the backend server 312 may be configured to receive image data 338 captured using the first camera 318 of the A/V recording and communication device 302. In further embodiments, the backend server 312 may transmit the image data 338 captured using the first camera 318 of the A/V recording and communication device 302 to the client device 316 and/or the law enforcement agency using the communication module 308.

Figure 21:
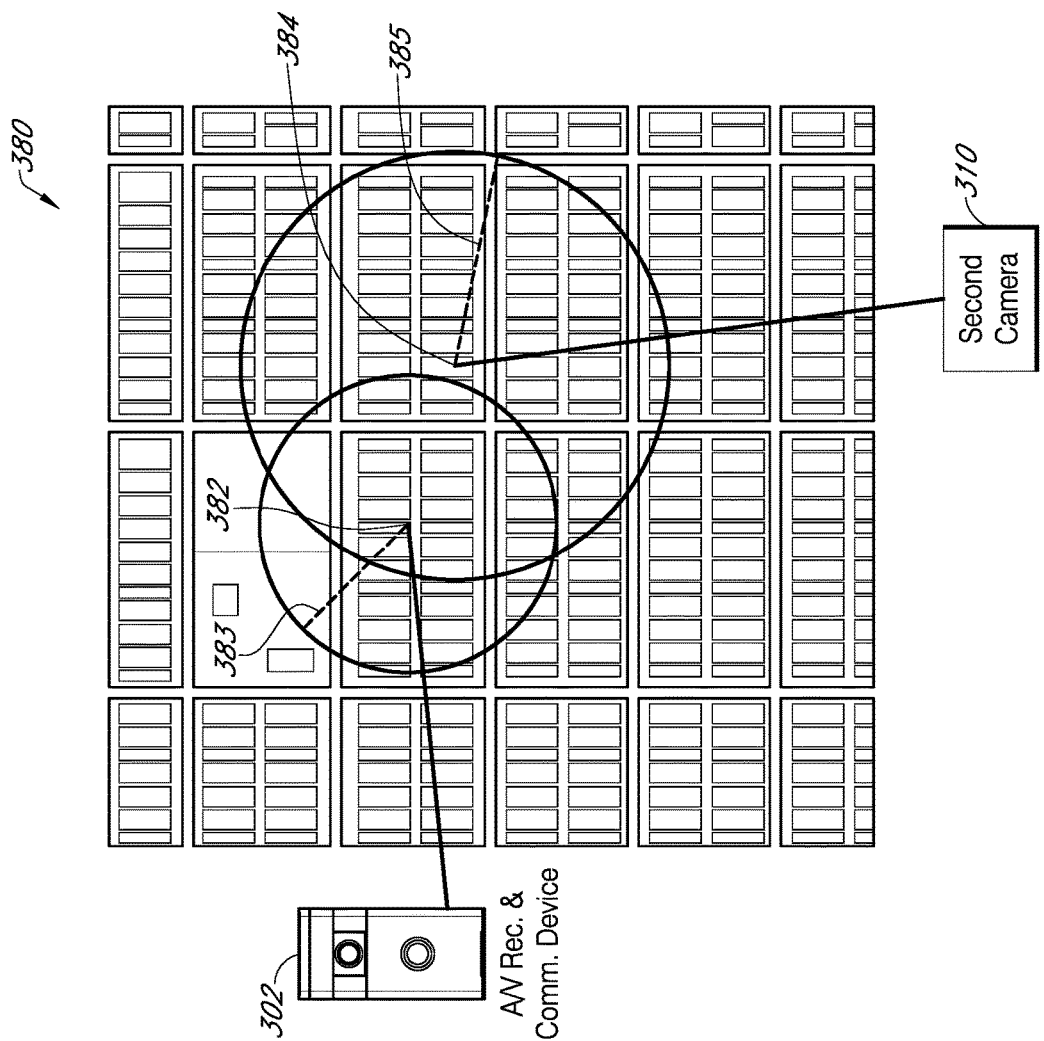
FIG. 21 is a screenshot of a map illustrating geographic boundaries according to an aspect of the present disclosure.

As described above, the backend server 312 may be configured to determine locations of the A/V recording and communication device 302 and the second camera 310. FIG. 21 is a screenshot of a map 380 illustrating geographic boundaries according to an aspect of the present disclosure. The map 380 indicates a location 382 of the A/V recording and communication device 302 and a location 384 of the second camera 310. In some embodiments, the backend server 312 may be configured to generate and transmit the power-up command signal 336 based on the location 382 of A/V recording and communication device 302 and the location 384 of the second camera 310. For example, in one embodiment, the backend server 312 may generate and transmit the power-up command signal 336 to the A/V recording and communication device 302 when the location 382 of the A/V recording and communication device 302 is within a geographic boundary of the location 384 of the second camera 310. In such embodiments, the geographic boundary may be a perimeter defined by a radius 385 extending from the location 384 of the second camera 310, where the radius 385 may be defined by a user (also referred to as "client"), or may be predetermined. Thus, in the illustrated embodiment of FIG. 21, the backend server 312 would generate and transmit the power-up command signal 336 to the A/V recording and communication device 302 since the location 382 of the A/V recording and communication device 302 is within the perimeter defined by the radius 385 around the second camera 310. In contrast, in another embodiment, the backend server 312 may generate and transmit the power-up command signal 336 to the A/V recording and communication device 302 when the location 384 of the second camera 310 is within a geographic boundary of the location 382 of the A/V recording and communication device 302. In such embodiments, the geographic boundary may be a perimeter defined by a radius 383 extending from the location 382 of the A/V recording and communication device 302, where the radius 383 may be defined by the user or may be predetermined. Thus, in the illustrated embodiment of FIG. 21, the backend server 312 would not generate and transmit the power-up command signal 336 to the A/V recording and communication device 302 since the location 384 of the second camera 310 is outside the perimeter defined by the radius 383 around the A/V recording and communication device 302. Although specific processes for determining locations of the A/V recording and communication device 302 and the second camera 310 are discussed above with respect to FIG. 20, any of a variety of processes for determining locations as appropriate to the specific application may be used in accordance with embodiments of the present disclosure.

Figure 22:
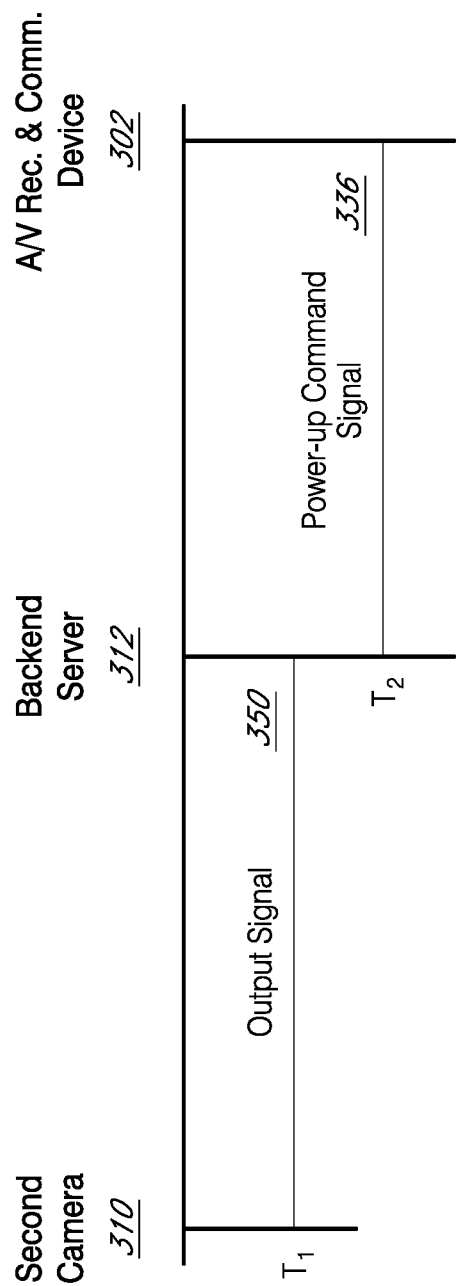
FIGS. 22 and 23 are sequence diagrams illustrating embodiments of processes for powering up a first camera of an A/V recording and communication device in network communication with a second camera according to various aspects of the present disclosure.

FIG. 22 is a sequence diagram illustrating an embodiment of a process for powering up the first camera 318 of an A/V recording and communication device 302 in network communication with the second camera 310 according to various aspects of the present disclosure. With reference to FIG. 22, the process may include a second camera 310, a backend server 312, and an A/V recording and communication device 302. At a time $T_1$, the second camera 310 may be configured to transmit an output signal 350 to the backend server 312, as described above. In response to receiving the output signal 350, the backend server 312 may generate and transmit a power-up command signal 336 to the A/V recording and communication device 302 at a time $T_2$. In some embodiments, the backend server 312 may first determine locations of the second camera 310 and the A/V recording and communication device 302 and generate and transmit the power-up command signal 336 when the locations are within one or more geographic boundaries, as described above. The A/V recording and communication device 302 may receive the power-up command signal 336 from the backend server 312 and power up the first camera 318 in response to the power-up command signal 336, as described above.

Figure 23:
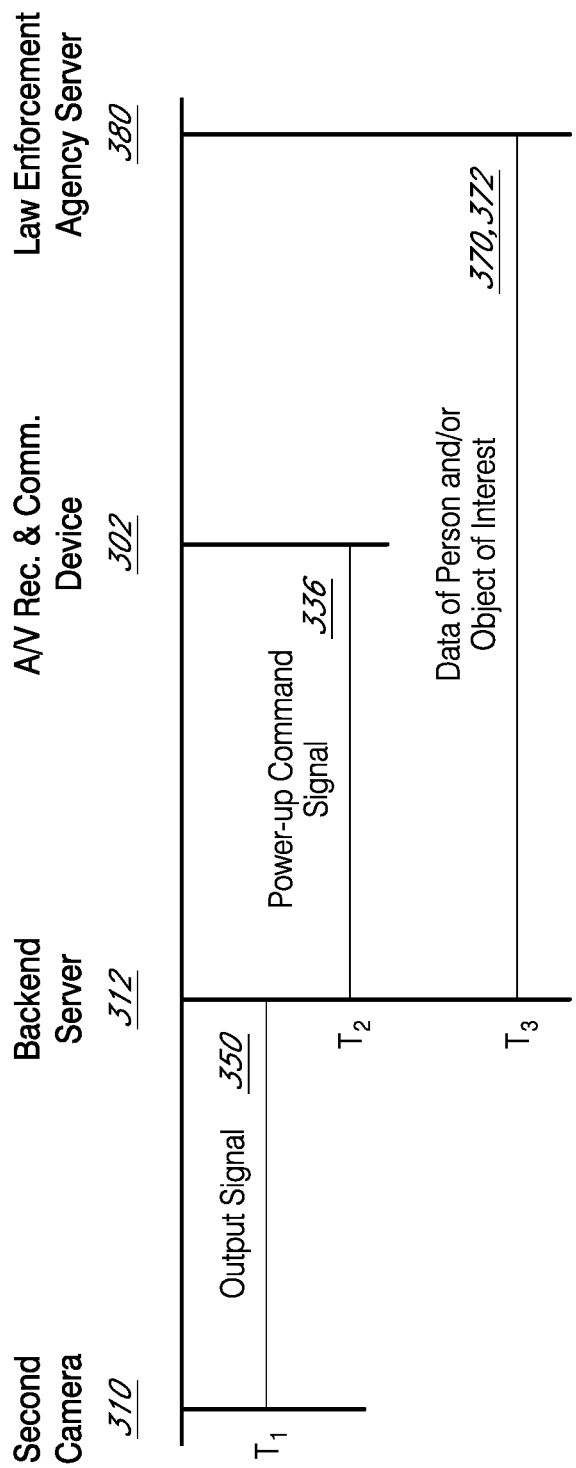

FIG. 23 is a sequence diagram illustrating another embodiment of a process for powering up the first camera 318 of an A/V recording and communication device 302 in network communication with the second camera 310 according to various aspects of the present disclosure. With reference to FIG. 23, the process may include a second camera 310, a backend server 312, an A/V recording and communication device 302, and a law enforcement agency server/database 380 (or a criminal database/registry or the like). At a time $T_1$, the second camera 310 may be configured to transmit an output signal 350 to the backend server 312, as described above. In response to receiving the output signal 350, the backend server 312 may generate and transmit a power-up command signal 336 to the A/V recording and communication device 302 at a time $T_2$. The A/V recording and communication device 302 may receive the power-up command signal 336 from the backend server 312 and power up the first camera 318 in response to the power-up command signal 336, as described above. In some embodiments, the output signal 350 may include image data 352 captured using the second camera 310. In various embodiments, the backend server 312 may generate data of a person and/or object of interest 370, 372 as described above. At a time $T_3$, the backend server 312 may transmit the data of the person and/or object of interest 370, 372 to a law enforcement agency server 380 in network communication with the backend server 312. In some embodiments, time $T_3$ may be after time $T_2$, while in other embodiments, time $T_3$ may substantially coincide with time $T_2$ (e.g., the power-up command signal 336 and the data of the person and/or object of interest 370, 372 may be transmitted at substantially the same time).

As described above, the present embodiments advantageously connect at least one second camera in network communication with an A/V recording and communication device having a first camera. In various embodiments, the second camera and the A/V recording and communication device may also be in network communication with a backend server to enhance functionalities of the second camera and the A/V recording and communication device. For example, the second camera may be in a different geographic location from the A/V recording and communication device and thus enable functionalities that might not be possible if the first and second cameras were part of a single device. In some embodiments, the second camera could have different performance characteristics from the first camera, such as different resolution and/or different power consumption. The second camera may be a low-power, low-resolution camera that may be powered on at all times, while the first camera of the A/V recording and communication device may be a high-power, high-resolution camera that is maintained in a low-power state. The second camera may then be used in a process for determining when to power up the high-power, high-resolution camera of the A/V recording and communication device. This arrangement can have particular benefit in a battery-powered A/V recording and communication device, where conserving battery power is desirable to prolong the usable life of the device between battery charges. In addition, the backend server may determine locations of the second camera and the A/V recording and communication device to determine when to power up the A/V recording and communication device using geographic boundaries.

Figure 24:
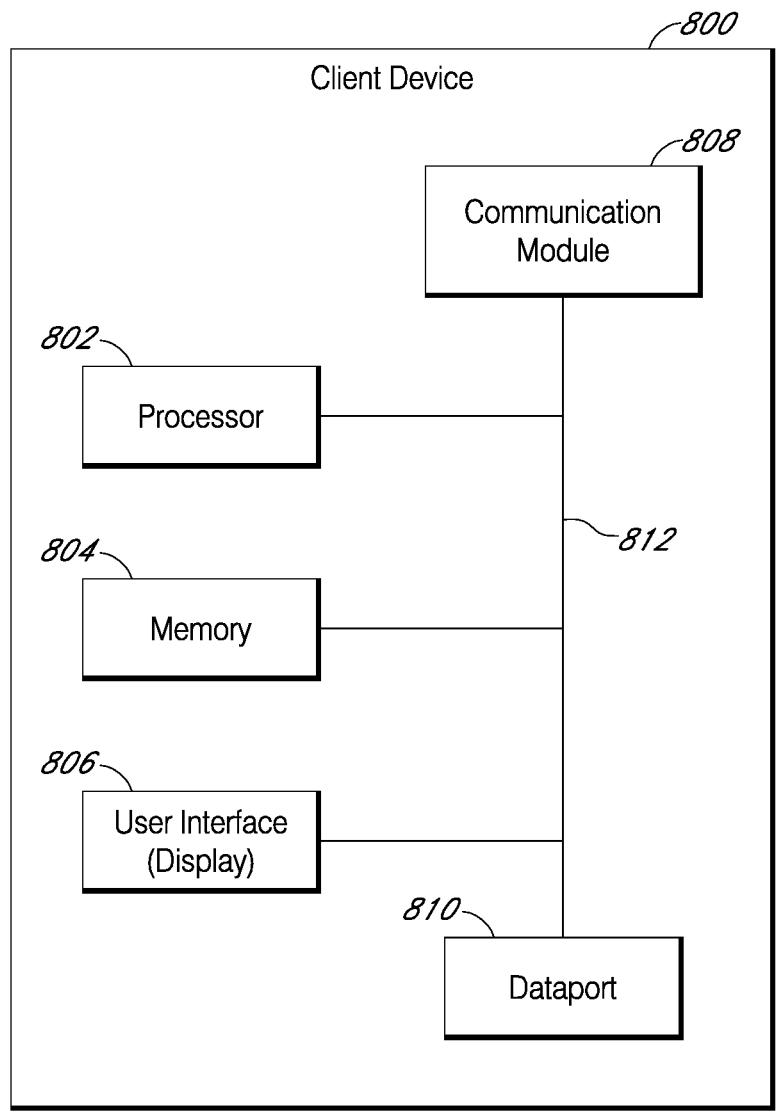
FIG. 24 is a functional block diagram of a client device on which the present embodiments may be implemented according to various aspects of the present disclosure.

FIG. 24 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 24, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 25:
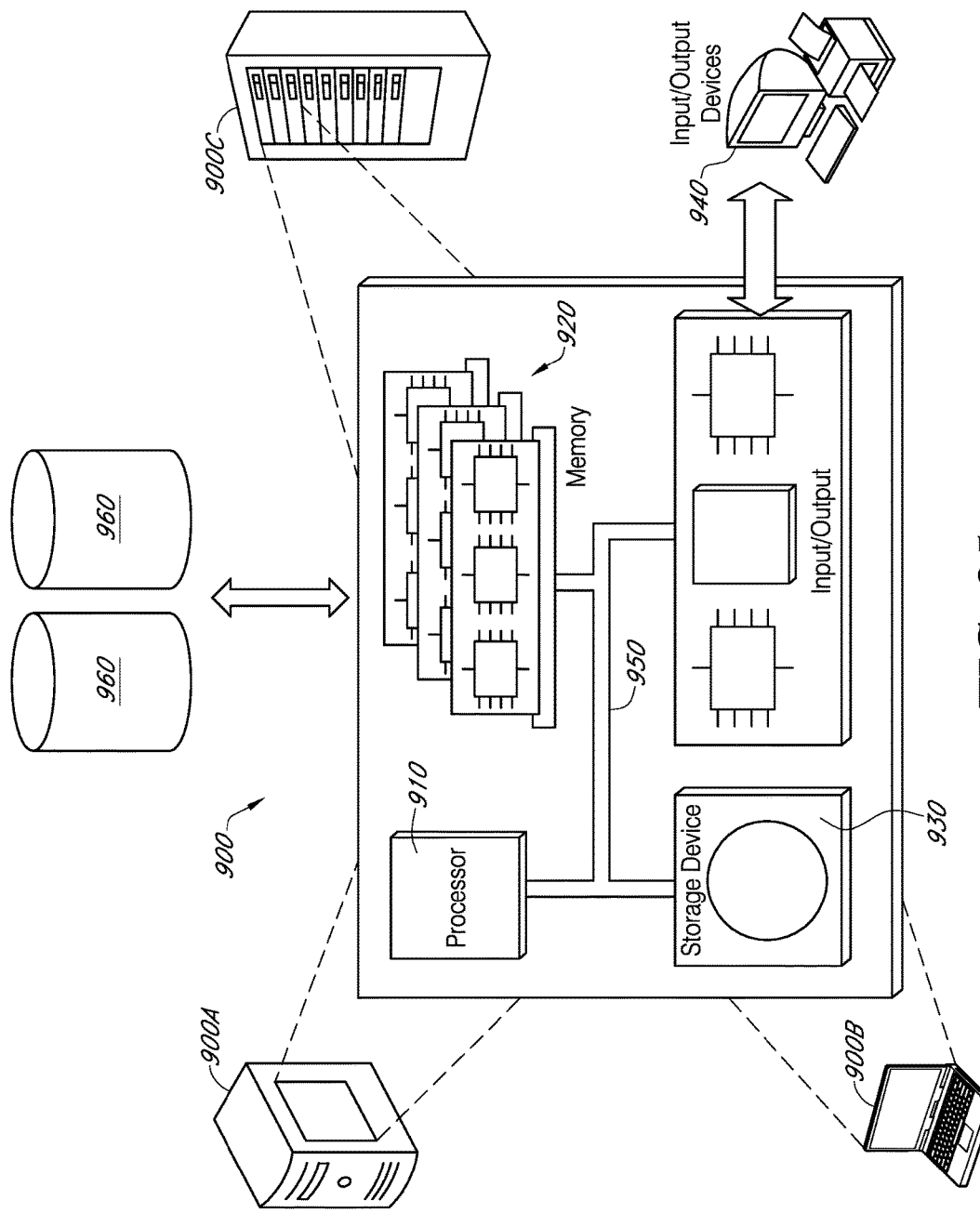
FIG. 25 is a functional block diagram of a general-purpose computing system on which the present embodiments may be implemented according to various aspects of present disclosure.

FIG. 25 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machinereadable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In a first aspect, an audio/video (A/V) recording and communication device is provided, the device comprising a first camera configured to capture image data at a first resolution; a communication module; and a processing module operatively connected to the first camera and the communication module, wherein the processing module is in network communication with a backend server via the communication module, the processing module comprising: a processor; and a camera application, wherein the camera application configures the processor to: maintain the first camera in a low-power state; receive a power-up command signal from the backend server based on an output signal from a second camera in network communication with the backend server; power up the first camera in response to the power-up command signal from the backend server based on the output signal from the second camera; and capture image data using the first camera in response to the power-up command signal from the backend server based on the output signal from the second camera.

In an embodiment of the first aspect, the camera application further configures the processor to capture image data using the first camera for a predetermined length of time in response to the power-up command signal from the backend server based on the output signal from the second camera.

In another embodiment of the first aspect, the second camera is configured to capture image data at a second resolution.

In another embodiment of the first aspect, the first resolution is higher than the second resolution.

In another embodiment of the first aspect, the second resolution is higher than the first resolution.

In another embodiment of the first aspect, the first resolution is equal to the second resolution.

In another embodiment of the first aspect, the camera application further configures the processor to transmit the image data captured using the first camera to the backend server using the communication module.

In another embodiment of the first aspect, the camera application further configures the processor to transmit the image data captured using the first camera to a client device using the communication module.

In another embodiment of the first aspect, the A/V recording and communication device further comprises a battery for providing power to the A/V recording and communication device.

In another embodiment of the first aspect, the A/V recording and communication device draws less power from the battery when the first camera is in the low-power state than when the first camera is powered up in response to the power-up command signal.

In a second aspect, a method is provided for an audio/video (A/V) recording and communication device having a first camera configured to capture image data at a first resolution, a communication module, and a processing module operatively connected to the first camera and the communication module, wherein the processing module is in network communication with a backend server via the communication module, the method comprising: maintaining the first camera in a low-power state; receiving a power-up command signal from the backend server based on an output signal from a second camera in network communication with the backend server and based on a location of the second camera and a location of the A/V recording and communication device; powering up the first camera in response to the power-up command signal from the backend server based on the output signal from the second camera; and capturing image data using the first camera in response to the power-up command signal from the backend server based on the output signal from the second camera.

An embodiment of the second aspect further comprises capturing image data using the first camera for a predetermined length of time in response to the power-up command signal from the backend server based on the output signal from the second camera.

In another embodiment of the second aspect, the second camera is configured to capture image data at a second resolution.

In another embodiment of the second aspect, the first resolution is higher than the second resolution.

In another embodiment of the second aspect, the second resolution is higher than the first resolution.

In another embodiment of the second aspect, the first resolution is equal to the second resolution.

Another embodiment of the second aspect further comprises transmitting the image data captured using the first camera to the backend server using the communication module.

Another embodiment of the second aspect further comprises transmitting the image data captured using the first camera to a client device using the communication module.

In another embodiment of the second aspect, the A/V recording and communication device further comprises a battery for providing power to the A/V recording and communication device.

In another embodiment of the second aspect, the A/V recording and communication device draws less power from the battery when the first camera is in the low-power state than when the first camera is powered up in response to the power-up command signal.

In a third aspect, a backend server is provided for audio/video (A/V) recording and communication devices, the server comprising: a communication module; and a processing module operatively connected to the communication module, wherein the processing module is in network communication with a second camera configured to captured image data at a second resolution, the processing module comprising: a processor; and a server application, wherein the server application configures the processor to: receive an output signal from the second camera using the communication module; generate a power-up command signal based on the output signal from the second camera; and transmit the power-up command signal to an A/V recording and communication device in network communication with the server, wherein the power-up command signal configures a first camera of the A/V recording and communication device to power up from a low-power state and capture image data at a first resolution.

In an embodiment of the third aspect, the first resolution is higher than the second resolution.

In another embodiment of the third aspect, the second resolution is higher than the first solution.

In another embodiment of the third aspect, the first resolution is equal to the second resolution.

In another embodiment of the third aspect, the server application further configures the processor to determine a location of the second camera and a location of the A/V recording and communication device.

In another embodiment of the third aspect, the server application further configures the processor to generate and transmit the power-up command signal to the A/V recording and communication device based on the location of the second camera and the location of the A/V recording and communication device.

In another embodiment of the third aspect, the server application further configures the processor to generate and transmit the power-up command signal to the A/V recording and communication device when the location of the A/V recording and communication device is within a geographic boundary of the second camera.

In another embodiment of the third aspect, the geographic boundary is a perimeter defined by a user-defined radius extending from the location of the second camera.

In another embodiment of the third aspect, the geographic boundary is a perimeter defined by a predetermined radius extending from the location of the second camera.

In another embodiment of the third aspect, the server application further configures the processor to generate and transmit the power-up command signal to the A/V recording and communication device when the location of the second camera is within a geographic boundary of the A/V recording and communication device.

In another embodiment of the third aspect, the geographic boundary is a perimeter defined by a user-defined radius extending from the location of the A/V recording and communication device.

In another embodiment of the third aspect, the geographic boundary is a perimeter defined by a predetermined radius extending from the location of the A/V recording and communication device.

In another embodiment of the third aspect, the output signal received from the second camera includes image data captured using the second camera.

In another embodiment of the third aspect, the server application further configures the processor to determine a person of interest based on the image data captured using the second camera.

In another embodiment of the third aspect, the server application further configures the processor to transmit data of the person of interest to the A/V recording and communication device using the communication module.

In another embodiment of the third aspect, the server application further configures the processor to transmit data of the person of interest to a law enforcement agency using the communication module.

In another embodiment of the third aspect, the server application further configures the processor to determine an object of interest based on the image data captured using the second camera.

In another embodiment of the third aspect, the server application further configures the processor to transmit data of the object of interest to the A/V recording and communication device using the communication module.

In another embodiment of the third aspect, the server application further configures the processor to transmit data of the object of interest to a law enforcement agency using the communication module.

In another embodiment of the third aspect, the server application further configures the processor to transmit the image data captured using the second camera to a client device using the communication module.

In another embodiment of the third aspect, the server application further configures the processor to receive image data captured using the first camera of the A/V recording and communication device using the communication module.

In another embodiment of the third aspect, the server application further configures the processor to transmit the image data captured using the first camera of the A/V recording and communication device to a client device using the communication module.

In a fourth aspect, a method for a backend server is provided, the backend server comprising a communication module and a processing module operatively connected to the communication module, wherein the processing module is in network communication with a second camera configured to captured image data at a second resolution, the method comprising: receiving an output signal from the second camera using the communication module; generating a power-up command signal based on the output signal from the second camera; and transmitting the power-up command signal to an audio/video (A/V) recording and communication device in network communication with the server, wherein the power-up command signal configures a first camera of the A/V recording and communication device to power up from a low-power state and capture image data at a first resolution.

In an embodiment of the fourth aspect, the first resolution is higher than the second resolution.

In another embodiment of the fourth aspect, the second resolution is higher than the first solution.

In another embodiment of the fourth aspect, the first resolution is equal to the second resolution.

Another embodiment of the fourth aspect further comprises determining a location of the second camera and a location of the A/V recording and communication device.

Another embodiment of the fourth aspect further comprises generating and transmitting the power-up command signal to the A/V recording and communication device based on the location of the second camera and the location of the A/V recording and communication device.

Another embodiment of the fourth aspect further comprises generating and transmitting the power-up command signal to the A/V recording and communication device when the location of the A/V recording and communication device is within a geographic boundary of the second camera.

In another embodiment of the fourth aspect, the geographic boundary is a perimeter defined by a user-defined radius extending from the location of the second camera.

In another embodiment of the fourth aspect, the geographic boundary is a perimeter defined by a predetermined radius extending from the location of the second camera.

Another embodiment of the fourth aspect further comprises generating and transmitting the power-up command signal to the A/V recording and communication device when the location of the second camera is within a geographic boundary of the A/V recording and communication device.

In another embodiment of the fourth aspect, the geographic boundary is a perimeter defined by a user-defined radius extending from the location of the A/V recording and communication device.

In another embodiment of the fourth aspect, the geographic boundary is a perimeter defined by a predetermined radius extending from the location of the A/V recording and communication device.

In another embodiment of the fourth aspect, the output signal received from the second camera includes image data captured using the second camera.

Another embodiment of the fourth aspect further comprises determining a person of interest based on the image data captured using the second camera.

Another embodiment of the fourth aspect further comprises transmitting data of the person of interest to the A/V recording and communication device using the communication module.

Another embodiment of the fourth aspect further comprises transmitting data of the person of interest to a law enforcement agency using the communication module.

Another embodiment of the fourth aspect further comprises determining an object of interest based on the image data captured using the second camera.

Another embodiment of the fourth aspect further comprises transmitting data of the object of interest to the A/V recording and communication device using the communication module.

Another embodiment of the fourth aspect further comprises transmitting data of the object of interest to a law enforcement agency using the communication module.

Another embodiment of the fourth aspect further comprises transmitting the image data captured using the second camera to a client device using the communication module.

Another embodiment of the fourth aspect further comprises receiving image data captured using the first camera of the A/V recording and communication device using the communication module.

Another embodiment of the fourth aspect further comprises transmitting the image data captured using the first camera of the A/V recording and communication device to a client device using the communication module.

In a fifth aspect, at least one server in network communication with an audio/video recording and communication device (A/V device) and a second camera is provided, the server(s) comprising: a communication module; a processor operatively connected to the communication module; and one or more computer-readable media storing a server application comprising instructions that, when executed by the processor, cause the processor to perform operations including: receiving, from the second camera using the communication module, image data captured by the second camera; determining that the image data captured by the second camera depicts a person of interest; generating a power-up command signal based on the determining that the image data captured by the second camera depicts the person of interest; and transmitting the power-up command signal to the A/V device, wherein the power-up command signal includes a command for a first camera of the A/V device to power up from a low-power state and capture image data.

In an embodiment of the fifth aspect, the first camera of the A/V device has a first resolution and the second camera has a second resolution, wherein the first resolution is higher than the second resolution.

In another embodiment of the fifth aspect, the server application comprises further instructions that, when executed by the processor, cause the processor to determine that the image data captured by the second camera depicts the person of interest by comparing the image data captured by the second camera for a match in at least one database.

In another embodiment of the fifth aspect, the at least one database is a criminal registry.

In another embodiment of the fifth aspect, the at least one database is a social network.

In another embodiment of the fifth aspect, the server application comprises further instructions that, when executed by the processor, cause the processor to determine a location of the second camera and a location of the A/V device.

In another embodiment of the fifth aspect, the server application comprises further instructions that, when executed by the processor, cause the processor to generate and transmit the power-up command signal to the A/V device when the location of the A/V device is within a geographic boundary of the location of the second camera.

In another embodiment of the fifth aspect, the geographic boundary is a perimeter defined by a user-defined radius extending from the location of the second camera.

In another embodiment of the fifth aspect, the geographic boundary is a perimeter defined by a predetermined radius extending from the location of the second camera.

In another embodiment of the fifth aspect, the server application comprises further instructions that, when executed by the processor, cause the processor to generate and transmit the power-up command signal to the A/V device when the location of the second camera is within a geographic boundary of the location of the A/V device.

In another embodiment of the fifth aspect, the geographic boundary is a perimeter defined by a user-defined radius extending from the location of the A/V device.

In another embodiment of the fifth aspect, the geographic boundary is a perimeter defined by a predetermined radius extending from the location of the A/V device.

In another embodiment of the fifth aspect, the server application comprises further instructions that, when executed by the processor, cause the processor to transmit the image data depicting the person of interest to a client device associated with the A/V device using the communication module.

In another embodiment of the fifth aspect, the server application comprises further instructions that, when executed by the processor, cause the processor to transmit the image data depicting the person of interest to a law enforcement agency using the communication module.

In another embodiment of the fifth aspect, the server application comprises further instructions that, when executed by the processor, cause the processor to determine an object of interest depicted in the image data captured using the second camera.

In another embodiment of the fifth aspect, the server application comprises further instructions that, when executed by the processor, cause the processor to transmit the image data depicting the object of interest to a client device associated with the A/V device using the communication module.

In another embodiment of the fifth aspect, the server application comprises further instructions that, when executed by the processor, cause the processor to transmit the image data depicting the object of interest to a law enforcement agency using the communication module.

In another embodiment of the fifth aspect, the server application comprises further instructions that, when executed by the processor, cause the processor to transmit the image data captured using the second camera to a client device associated with the A/V device using the communication module.

In another embodiment of the fifth aspect, the server application comprises further instructions that, when executed by the processor, cause the processor to receive image data captured using the first camera of the A/V device using the communication module.

In another embodiment of the fifth aspect, the server application comprises further instructions that, when executed by the processor, cause the processor to transmit the image data captured using the first camera of the A/V device to a client device associated with the A/V device using the communication module.

The above description presents the best mode contemplated for carrying out the present embodiments, and of the manner and process of practicing them, in such full, clear, concise, and exact terms as to enable any person skilled in the art to which they pertain to practice these embodiments.

The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. At least one server in network communication with an audio/video recording and communication device (A/V device) and a second camera, the server(s) comprising:
    a communication module;
    a processor operatively connected to the communication module; and
    one or more computer-readable media storing a server application comprising instructions that, when executed by the processor, cause the processor to perform operations including:
        receiving, from the second camera using the communication module, image data captured by the second camera;
        determining that the image data captured by the second camera depicts a person of interest;
        generating a power-up command signal based on the determining that the image data captured by the second camera depicts the person of interest; and
        transmitting the power-up command signal to the A/V device, wherein the power-up command signal includes a command for a first camera of the A/V device to power up from a low-power state and capture image data.

2. The server(s) of claim 1, wherein the first camera of the A/V device has a first resolution and the second camera has a second resolution, wherein the first resolution is higher than the second resolution.

3. The server(s) of claim 1, wherein the server application comprises further instructions that, when executed by the processor, cause the processor to determine that the image data captured by the second camera depicts the person of interest by comparing the image data captured by the second camera for a match in at least one database.

4. The server(s) of claim 3, wherein the at least one database is a criminal registry.

5. The server(s) of claim 3, wherein the at least one database is a social network.

6. The server(s) of claim 1, wherein the server application comprises further instructions that, when executed by the processor, cause the processor to determine a location of the second camera and a location of the A/V device.

7. The server(s) of claim 6, wherein the server application comprises further instructions that, when executed by the processor, cause the processor to generate and transmit the power-up command signal to the A/V device when the location of the A/V device is within a geographic boundary of the location of the second camera.

8. The server(s) of claim 7, wherein the geographic boundary is a perimeter defined by a user-defined radius extending from the location of the second camera.

9. The server(s) of claim 7, wherein the geographic boundary is a perimeter defined by a predetermined radius extending from the location of the second camera.

10. The server(s) of claim 6, wherein the server application comprises further instructions that, when executed by the processor, cause the processor to generate and transmit the power-up command signal to the A/V device when the location of the second camera is within a geographic boundary of the location of the A/V device.

11. The server(s) of claim 10, wherein the geographic boundary is a perimeter defined by a user-defined radius extending from the location of the A/V device.

12. The server(s) of claim 10, wherein the geographic boundary is a perimeter defined by a predetermined radius extending from the location of the A/V device.

13. The server(s) of claim 1, wherein the server application comprises further instructions that, when executed by the processor, cause the processor to transmit the image data depicting the person of interest to a client device associated with the A/V device using the communication module.

14. The server(s) of claim 1, wherein the server application comprises further instructions that, when executed by the processor, cause the processor to transmit the image data depicting the person of interest to a law enforcement agency using the communication module.

15. The server(s) of claim 1, wherein the server application comprises further instructions that, when executed by the processor, cause the processor to determine an object of interest depicted in the image data captured using the second camera.

16. The server(s) of claim 15, wherein the server application comprises further instructions that, when executed by the processor, cause the processor to transmit the image data depicting the object of interest to a client device associated with the A/V device using the communication module.

17. The server(s) of claim 15, wherein the server application comprises further instructions that, when executed by the processor, cause the processor to transmit the image data depicting the object of interest to a law enforcement agency using the communication module.

18. The server(s) of claim 1, wherein the server application comprises further instructions that, when executed by the processor, cause the processor to transmit the image data captured using the second camera to a client device associated with the A/V device using the communication module.

19. The server(s) of claim 1, wherein the server application comprises further instructions that, when executed by the processor, cause the processor to receive image data captured using the first camera of the A/V device using the communication module.

20. The server(s) of claim 19, wherein the server application comprises further instructions that, when executed by the processor, cause the processor to transmit the image data captured using the first camera of the A/V device to a client device associated with the A/V device using the communication module.

* * * * *